(12) United States Patent
Dent

(10) Patent No.: US 8,279,745 B2
(45) Date of Patent: Oct. 2, 2012

(54) ORTHOGONAL VECTOR DSL

(75) Inventor: Paul W. Dent, Pittsboro, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 438 days.

(21) Appl. No.: 12/623,751

(22) Filed: Nov. 23, 2009

(65) Prior Publication Data

US 2011/0122767 A1   May 26, 2011

(51) Int. Cl.
*H04J 11/00* (2006.01)

(52) U.S. Cl. ........................................ 370/208; 370/343

(58) Field of Classification Search .................. None
See application file for complete search history.

(56) References Cited

U.S. PATENT DOCUMENTS

| | | | | |
|---|---|---|---|---|
| 5,856,980 | A * | 1/1999 | Doyle | 714/704 |
| 6,711,121 | B1 * | 3/2004 | Gerakoulis et al. | 370/205 |
| 2002/0044597 | A1 * | 4/2002 | Shively et al. | 375/222 |
| 2005/0220180 | A1 * | 10/2005 | Barlev et al. | 375/222 |
| 2006/0001501 | A1 * | 1/2006 | He et al. | 333/25 |
| 2007/0173195 | A1 * | 7/2007 | Widrow | 455/3.05 |
| 2008/0287022 | A1 * | 11/2008 | Dhawan et al. | 442/229 |

FOREIGN PATENT DOCUMENTS

EP   2 056 548 A1   5/2009

OTHER PUBLICATIONS

Rao, K. and Ahmed, N., "Orthogonal Transforms for Digital Signal Processing", IEEE International Conference on ICASSP '76, Apr. 1976, p. 136-140.*

* cited by examiner

*Primary Examiner* — Kibrom T Hailu
*Assistant Examiner* — Benjamin Lamont

(57) ABSTRACT

A wire-based infrastructure capable of delivering high data rates is described herein. A transmission system, reception system, and/or repeater uses wire-mapping code matrices to reduce interference in multi-wire cables to increase the data rate provided by such multi-wire cables. More particularly, code mapping matrices are applied to transmission and/or received input signals to generate a mapped signal for each output wire or corresponding to each input wire such that each mapped signal comprises a different combination of all of the input signals. Different ones of the wire-mapped signals are ultimately transmitted on different wires. In so doing, the present invention facilitates crosstalk reduction, and therefore, provides a technique that increases the data rate available on multi-wire cables.

9 Claims, 18 Drawing Sheets

| | | | | | | | | | | | | | | | |
|---|---|---|---|---|---|---|---|---|---|---|---|---|---|---|---|
| 44.00 | -1.43 | -1.43 | -1.43 | -1.43 | -1.43 | -1.43 | -1.43 | -22.00 | -1.43 | -1.43 | -1.43 | -1.43 | -1.43 | -1.43 | -1.43 |
| -1.43 | 44.00 | -1.43 | -1.43 | -1.43 | -1.43 | -1.43 | -1.43 | -1.43 | -22.00 | -1.43 | -1.43 | -1.43 | -1.43 | -1.43 | -1.43 |
| -1.43 | -1.43 | 44.00 | -1.43 | -1.43 | -1.43 | -1.43 | -1.43 | -1.43 | -1.43 | -22.00 | -1.43 | -1.43 | -1.43 | -1.43 | -1.43 |
| -1.43 | -1.43 | -1.43 | 44.00 | -1.43 | -1.43 | -1.43 | -1.43 | -1.43 | -1.43 | -1.43 | -22.00 | -1.43 | -1.43 | -1.43 | -1.43 |
| -1.43 | -1.43 | -1.43 | -1.43 | 44.00 | -1.43 | -1.43 | -1.43 | -1.43 | -1.43 | -1.43 | -1.43 | -22.00 | -1.43 | -1.43 | -1.43 |
| -1.43 | -1.43 | -1.43 | -1.43 | -1.43 | 44.00 | -1.43 | -1.43 | -1.43 | -1.43 | -1.43 | -1.43 | -1.43 | -22.00 | -1.43 | -1.43 |
| -1.43 | -1.43 | -1.43 | -1.43 | -1.43 | -1.43 | 44.00 | -1.43 | -1.43 | -1.43 | -1.43 | -1.43 | -1.43 | -1.43 | -22.00 | -1.43 |
| -1.43 | -1.43 | -1.43 | -1.43 | -1.43 | -1.43 | -1.43 | 44.00 | -1.43 | -1.43 | -1.43 | -1.43 | -1.43 | -1.43 | -1.43 | -22.00 |
| -22.00 | -1.43 | -1.43 | -1.43 | -1.43 | -1.43 | -1.43 | -1.43 | 44.00 | -1.43 | -1.43 | -1.43 | -1.43 | -1.43 | -1.43 | -1.43 |
| -1.43 | -22.00 | -1.43 | -1.43 | -1.43 | -1.43 | -1.43 | -1.43 | -1.43 | 44.00 | -1.43 | -1.43 | -1.43 | -1.43 | -1.43 | -1.43 |
| -1.43 | -1.43 | -22.00 | -1.43 | -1.43 | -1.43 | -1.43 | -1.43 | -1.43 | -1.43 | 44.00 | 1.43 | -1.43 | -1.43 | -1.43 | -1.43 |
| -1.43 | -1.43 | -1.43 | -22.00 | -1.43 | -1.43 | -1.43 | -1.43 | -1.43 | -1.43 | -1.43 | 44.00 | -1.43 | -1.43 | -1.43 | -1.43 |
| -1.43 | -1.43 | -1.43 | -1.43 | -22.00 | -1.43 | -1.43 | -1.43 | -1.43 | -1.43 | -1.43 | -1.43 | 44.00 | -1.43 | -1.43 | -1.43 |
| -1.43 | -1.43 | -1.43 | -1.43 | -1.43 | -22.00 | -1.43 | -1.43 | -1.43 | -1.43 | -1.43 | -1.43 | -1.43 | 44.00 | -1.43 | -1.43 |
| -1.43 | -1.43 | -1.43 | -1.43 | -1.43 | -1.43 | -22.00 | -1.43 | -1.43 | -1.43 | -1.43 | -1.43 | -1.43 | -1.43 | 44.00 | -1.43 |
| -1.43 | -1.43 | -1.43 | -1.43 | -1.43 | -1.43 | -1.43 | -22.00 | -1.43 | -1.43 | -1.43 | -1.43 | -1.43 | -1.43 | -1.43 | 44.00 |

*FIG. 8*

| 44 | -22 | -1.43 | -1.43 | -1.43 | -1.43 | -1.43 | -1.43 | -1.43 | -1.43 | -1.43 | -1.43 | -1.43 | -1.43 | -1.43 | -1.43 |
|---|---|---|---|---|---|---|---|---|---|---|---|---|---|---|---|
| -22 | 44 | -1.43 | -1.43 | -1.43 | -1.43 | -1.43 | -1.43 | -1.43 | -1.43 | -1.43 | -1.43 | -1.43 | -1.43 | -1.43 | -1.43 |
| -1.43 | -1.43 | 44 | -22 | -1.43 | -1.43 | -1.43 | -1.43 | -1.43 | -1.43 | -1.43 | -1.43 | -1.43 | -1.43 | -1.43 | -1.43 |
| -1.43 | -1.43 | -22 | 44 | -1.43 | -1.43 | -1.43 | -1.43 | -1.43 | -1.43 | -1.43 | -1.43 | -1.43 | -1.43 | -1.43 | -1.43 |
| -1.43 | -1.43 | -1.43 | -1.43 | 44 | -22 | -1.43 | -1.43 | -1.43 | -1.43 | -1.43 | -1.43 | -1.43 | -1.43 | -1.43 | -1.43 |
| -1.43 | -1.43 | -1.43 | -1.43 | -22 | 44 | -1.43 | -1.43 | -1.43 | -1.43 | -1.43 | -1.43 | -1.43 | -1.43 | -1.43 | -1.43 |
| -1.43 | -1.43 | -1.43 | -1.43 | -1.43 | -1.43 | 44 | -22 | -1.43 | -1.43 | -1.43 | -1.43 | -1.43 | -1.43 | -1.43 | -1.43 |
| -1.43 | -1.43 | -1.43 | -1.43 | -1.43 | -1.43 | -22 | 44 | -1.43 | -1.43 | -1.43 | -1.43 | -1.43 | -1.43 | -1.43 | -1.43 |
| -1.43 | -1.43 | -1.43 | -1.43 | -1.43 | -1.43 | -1.43 | -1.43 | 44 | -22 | -1.43 | -1.43 | -1.43 | -1.43 | -1.43 | -1.43 |
| -1.43 | -1.43 | -1.43 | -1.43 | -1.43 | -1.43 | -1.43 | -1.43 | -22 | 44 | -1.43 | -1.43 | -1.43 | -1.43 | -1.43 | -1.43 |
| -1.43 | -1.43 | -1.43 | -1.43 | -1.43 | -1.43 | -1.43 | -1.43 | -1.43 | -1.43 | 44 | -22 | -1.43 | -1.43 | -1.43 | -1.43 |
| -1.43 | -1.43 | -1.43 | -1.43 | -1.43 | -1.43 | -1.43 | -1.43 | -1.43 | -1.43 | -22 | 44 | -1.43 | -1.43 | -1.43 | -1.43 |
| -1.43 | -1.43 | -1.43 | -1.43 | -1.43 | -1.43 | -1.43 | -1.43 | -1.43 | -1.43 | -1.43 | -1.43 | 44 | -22 | -1.43 | -1.43 |
| -1.43 | -1.43 | -1.43 | -1.43 | -1.43 | -1.43 | -1.43 | -1.43 | -1.43 | -1.43 | -1.43 | -1.43 | -22 | 44 | -1.43 | -1.43 |
| -1.43 | -1.43 | -1.43 | -1.43 | -1.43 | -1.43 | -1.43 | -1.43 | -1.43 | -1.43 | -1.43 | -1.43 | -1.43 | -1.43 | 44 | -22 |
| -1.43 | -1.43 | -1.43 | -1.43 | -1.43 | -1.43 | -1.43 | -1.43 | -1.43 | -1.43 | -1.43 | -1.43 | -1.43 | -1.43 | -22 | 44 |

*FIG. 9*

ORTHOGONAL VECTOR DSL

BACKGROUND

The invention described herein relates generally to high speed communications over multi-wire cables, and more particularly to increasing the data rate of OFDM communications over multi-wire cables.

Digital Subscriber Lines (DSLs) provide high-speed Internet connections with higher data rates than previous dial-up lines. DSL exploits the fact that a telephone cable from a home to the exchange will support signals at much higher frequencies than the 300 Hz-3.4 kHz telephone audio signal. To enable conventional telephone operations to function simultaneously with DSL operations, DSL uses filters to divide the spectrum into DC+Audio for the conventional telephone and a high frequency range of about 100 kHz to 1 MHz, or even higher for advanced forms of DSL.

While DSL provides high-speed communications via copper-wire cables, conventional DSL and other copper wire-based communications cannot currently deliver the total data rate of approximately 40-60 Mb/s required to allow independent HDTV program selection on several different TVs in a single household. Instead, copper wire-based communications can only offer a very limited TV service, called IPTV, which has a limited data rate that limits the quality of the received programming and does not permit several TV programs to be viewed simultaneously in a home. In direct contrast, the higher bandwidths available to cable and satellite communications enable cable and satellite companies to offer full TV services for multiple TVs in a single household, including multiple HDTV services, in addition to regular voice and Internet services. As a result, cable and satellite communications companies currently have a competitive advantage over telephone companies that offer services via their traditional copper wire infrastructure. On the other hand, the advantage of a copper wire infrastructure is that it provides one or more copper wire pairs unique to each subscriber, which allows the selection of the service or program to be delivered to be made at the exchange.

There are a number of hindrances to increasing the data rate of DSL communications over copper wires. For example, the line attenuation of copper wires per unit length increases at higher DSL frequencies. Thus, as the distance from the exchange increases, the signal-to-noise ratio (SNR) at the higher frequencies decreases. SNR considerations thus either limit the maximum useable frequency, and/or limit the largest useable modulation constellation, and thus the bits/sec/Hz. Further, crosstalk between signals on different twisted pairs in the same cable also degrades the SNR. In addition, long, medium and short wave radio broadcasting also use the same frequency range used for DSL operations. Existing unscreened lines may therefore suffer from external interference caused by strong radio stations, which may blot out part of the spectrum.

Crosstalk and external interference typically increase the noise levels on multi-pair copper wire cables beyond the thermal noise (kT) level by a considerable amount. For example, the noise level of a multi-pair cable may be −140 dBm/Hz, whereas kT=−173 dBm/Hz. This 33 dB higher-than-thermal noise level limits the cable distances to the exchange to a few kilometers, and therefore, limits the number of bits/sec/Hz of bandwidth that can be successfully modulated and demodulated using higher order QAM signal constellations such as 256 QAM, and even 65536 QAM.

Current copper wire infrastructures may utilize multiple techniques to reduce the crosstalk and/or external interference. The most common technique for reducing crosstalk between DSL signals on different wires is called "Dynamic Spectrum Management" (DSM). DSM reduces crosstalk by avoiding the use of the same subcarrier in adjacent wires at the same time. While DSM is effective when fewer than all of the wires in a cable are used, DSM is significantly less effective when all wires are used, e.g., when the highest data rates are desired.

Another crosstalk reduction technique requires all DSL signals to terminate at the same user's modem. However, this technique is only available when all DSL signals in the cable terminate at the same end station, e.g., house, and thus does not apply to cables from curbside distribution boxes to the exchange, which carry DSL signals for different users.

Cable manufacturers may also consider crosstalk issues when manufacturing multi-wire cables, as explained in reference 1 "Overview Over Transmission Media I." For example, the cable manufacturer may vary the disposition of each pair relative to every other pair cyclically or randomly so that any residual imbalance in either capacitive or inductive coupling is distributed evenly from a given pair to every other pair. A consequence of such a cable weave is that the capacitance from every wire to every other wire is nominally equal, except for the other wire of the same pair with which it is twisted over the entire cable length. Likewise, the mutual inductances between any wire and any other wire are nominally equal, except for the other wire of the pair with which it is twisted over the entire cable length. The degree of equality of inter-wire capacitances and mutual inductances is however very cable-dependent.

Despite all of these options, copper wire infrastructures currently cannot deliver the data rates necessary to provide full TV services, especially HDTV services, to multiple TVs in a single household. Thus, there is a great motivation for copper wire companies to explore ways to deliver data rates that will support delivery of multiple HDTV programs to multiple households, thereby allowing them to compete effectively with cable and satellite companies.

SUMMARY

The present invention provides various elements for a wire-based communication system that reduce interference in multi-wire cables to increase the data rate available on the multi-wire cables. Broadly, the present invention applies at least one code mapping matrix to input signals to generate a wire-mapped signal corresponding to each wire of the multi-wire cable such that each wire-mapped signal comprises a different combination of all of the input signals applied to the code mapping matrix. In so doing, the present invention facilitates crosstalk reduction, and therefore, provides a technique that increases the data rate capabilities of multi-wire cables.

More particularly, a transmission system and transmission method according to the present invention processes three or more input signals for transmission along a multi-wire cable comprising three or more wires, wherein the multi-wire cable comprises a wire for each input signal, and wherein one of the input signals comprises a null signal. The transmission system comprises a wire-mapping circuit and a transmitter. The wire-mapping circuit applies a wire-mapping code matrix to the input signals to generate a wire-mapped signal for each wire such that each wire-mapped signal comprises a different combination of all of the input signals. The transmitter generates a transmission signal for each wire based on the corresponding wire-mapped signal, and drives each wire with the corresponding transmission signal. As described in further detail herein, the wire-mapping process applied to the input signals reduces crosstalk caused by the multi-wire cable, particularly twisted-pair multi-wire cables, which increases the overall data rate available on the multi-wire cable.

A reception system and reception method according to the present invention processes three or more signals received via a multi-wire cable comprising three or more wires, wherein each wire carries a different signal. The reception system comprises a receiver and a de-mapping circuit. The receiver processes the received signals to estimate a wire-mapped signal associated with each wire. The de-mapping circuit applies a de-mapping code matrix to the wire-mapped signals to estimate de-mapped signal streams such that each de-mapped signal stream comprises a different combination of all of the wire-mapped signals, wherein each de-mapped signal stream corresponds to a different wire, and wherein one of the de-mapped signal streams corresponds to a null signal stream.

The transmission and reception systems may be used to respectively transmit and receive multi-carrier signals having one or more subcarriers or subcarrier groups. For the multi-subcarrier or multi-subcarrier group example, one exemplary wire-mapping circuit of the transmission system comprises a plurality of wire-mapping units, one for each subcarrier or subcarrier group, and the transmitter comprises one multi-carrier modulator per wire. Each wire-mapping unit applies a unit-specific wire-mapping code matrix to symbols from each of the input signals to generate a component of the wire-mapped signal for each wire, where each wire-mapped signal component comprises a different combination of all of the corresponding input symbols, and where all of the wire-mapped signal components generated by one wire-mapping unit correspond to the same subcarrier or subcarrier group. Thus, each of the plurality of wire-mapping units outputs a wire-mapped signal component associated with a particular subcarrier or subcarrier group for each wire-mapped signal. The wire-mapping circuit therefore generates a wire-mapped signal for each wire, where each wire-mapped signal comprises a wire-mapped signal component for each subcarrier or subcarrier group. Each modulator modulates the corresponding wire-mapped signal to generate the multi-carrier transmission signal.

Similarly, the de-mapping circuit of a multi-carrier reception system comprises a plurality of de-mapping units, and the receiver comprises a demodulator for each wire. Each demodulator demodulates the multi-carrier signal received via the corresponding wire to estimate a wire-mapped signal associated with the corresponding wire, where each wire-mapped signal comprises a wire-mapped signal component for each subcarrier or subcarrier group. Each de-mapping unit apples a unit-specific de-mapping code matrix to the wire-mapped signal components associated with the corresponding subcarrier or subcarrier group to estimate a symbol associated with the corresponding subcarrier or subcarrier group for each de-mapped signal stream, wherein each symbol comprises a different combination of all of the corresponding input wire-mapped signal components.

The present invention may also combine the reception and transmission systems to generate a repeater that processes signals received on a large multi-wire cable, e.g., a cable containing signals intended for multiple homes or user locations, for retransmission on smaller multi-wire cables, e.g., cables terminating at individual homes or user locations. More particularly, the repeater comprises a reception system for processing signals received via a first multi-wire cable to generate a de-mapped signal stream associated with each wire in the first multi-wire cable. The number of received signals equals the number of wires in the first multi-wire cable, and at least one of the received signals corresponds to a null signal. The repeater further comprises a plurality of transmission systems, each connected to a different second multi-wire cable, and each configured to process the de-mapped signal streams associated with one of a plurality of second multi-wire cables for retransmission via the corresponding second multi-wire cable. Each second multi-wire cable comprises a wire for each corresponding retransmission signal. As with the individual transmission and reception systems, the repeater may be configured for one or more subcarriers or subcarrier groups.

BRIEF DESCRIPTION OF THE DRAWINGS

FIG. 8 shows an exemplary capacitance matrix for an 8-pair multi-wire cable.

FIG. 9 shows another exemplary capacitance matrix for an 8-pair multi-wire cable.

DETAILED DESCRIPTION

Figure 1:
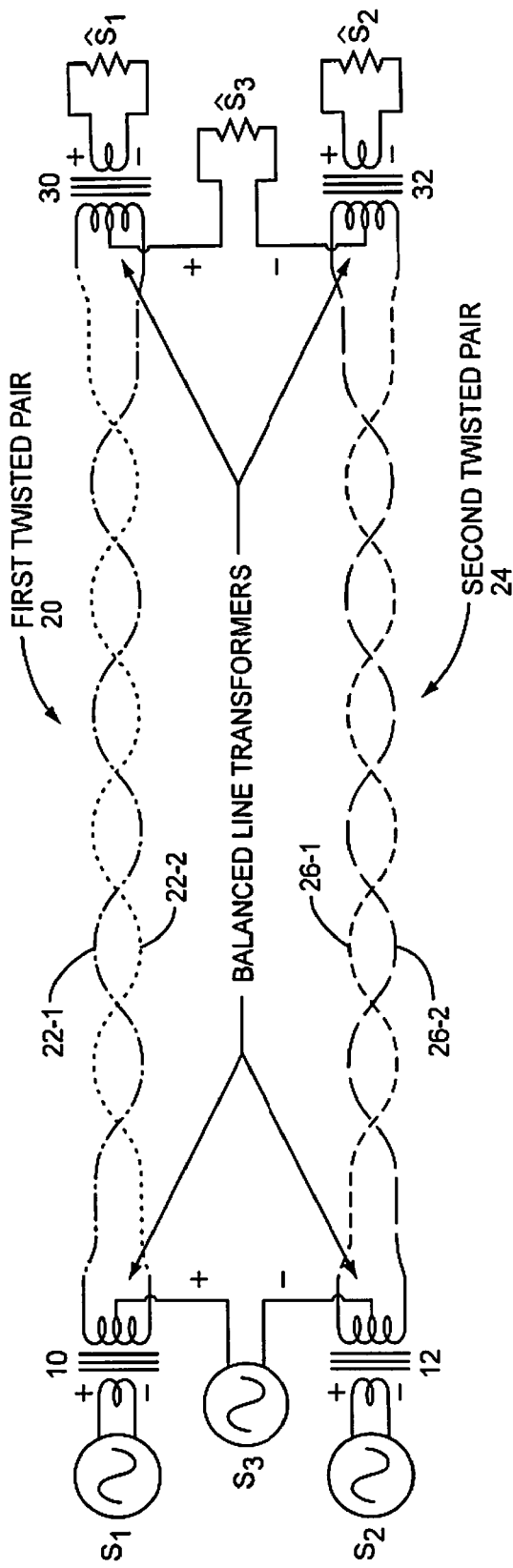
FIG. 1 shows a conventional phantom circuit.

The present invention enables copper wire infrastructures to transmit high data rate signals, e.g., 40-60 Mb/s, to individual end stations, e.g., individual households. To that end the present invention provides a transmission system, reception system, and/or repeater that respectively generate transmission signals for transmission along a multi-wire cable, process signals received via a multi-wire cable, and retransmit signals received on a large multi-wire cable via a plurality of smaller multi-wire cables. While the following describes the present invention in terms of OFDM signals having a plurality of subcarriers, it will be appreciated that the present invention also applies to signals having a single subcarrier or frequency band, and to signals having a plurality of subcarrier groups. Further, while the following describes the present invention in terms of cables have multiple twisted pairs of wires, it will be appreciated that the present invention does not require twisted pair cables and applies to any multi-wire cable.

The transmission system of the present invention processes three or more input signals to generate transmission signals for transmission along a multi-wire cable comprising three or more wires, where each wire corresponds to a different input signal, and where one of the input signals comprises a null signal. In one exemplary embodiment, the transmission system comprises an OFDM transmission system that includes a transmitter and a wire-mapping circuit comprising a wire-mapping unit for each OFDM subcarrier. To reduce crosstalk, and therefore to increase the achievable data rate, the wire-mapping units apply wire-mapping code matrices to the input signals to generate wire-mapped signals for each wire, wherein each wire-mapped signal comprises a different combination of all of the input signals. More particularly, each wire-mapping unit in the wire-mapping circuit applies a unit-specific wire-mapping code matrix to symbols from each input signal associated with the same OFDM subcarrier to generate a subcarrier-specific component of the wire-mapped signal for each wire such that each of the subcarrier-specific components output by a single wire-mapping unit comprise a different combination of all of the symbols input to that wire-mapping unit. Each wire-mapped signal comprises the collection of all of the subcarrier-specific components output by the plurality of wire-mapping units associated with a particular wire. The transmission system then generates the OFDM transmission signal for each wire based on the corresponding wire-mapped signal. It will be appreciated that each wire-mapping unit may correspond to a different subcarrier group instead of individual subcarriers.

Each OFDM transmission signal travels along a different wire of the multi-wire cable to the reception system, where they are received and processed to estimate the original input signals. To that end, the reception system comprises a receiver and a de-mapping circuit comprising a de-mapping unit for each OFDM subcarrier. The receiver processes the received signals to estimate a wire-mapped signal associated with each wire, where each wire-mapped signal comprises a subcarrier-specific component for each of the OFDM subcarriers. Each de-mapping unit applies a unit-specific de-mapping code matrix to the components from all of the wire-mapped signals corresponding to the same OFDM subcarrier to generate sub-carrier-specific symbol estimates for a plurality of de-mapped symbol streams, where the number of de-mapped symbol streams equals the number of received signals, and where each subcarrier-specific symbol estimate comprises a different combination of all of the corresponding subcarrier-specific wire-mapped signal components. It will be appreciated that each de-mapping unit may correspond to a different subcarrier group instead of individual subcarriers.

Consider the scenario where a multi-wire cable comprising M wires carries an OFDM transmission signal comprising N subcarriers on each wire. In this example, the wire-mapping circuit in the transmission system comprises N wire-mapping units, one for each subcarrier. Each wire-mapping unit applies a unit-specific wire-mapping code matrix to the M symbols of the input signals associated with the corresponding OFDM subcarrier to generate M subcarrier-specific wire-mapped signal components, one for each of the M wire-mapped signals. The transmitter subsequently generates an OFDM transmission signal for each wire based on the N corresponding wire-mapped signal components. Similarly, the receiver in the reception system processes the received signals to generate a wire-mapped signal for each wire, each wire-mapped signal comprising N wire-mapped signal components, one for each OFDM subcarrier. The de-mapping circuit in the reception system comprises N de-mapping units, one for each subcarrier. Each de-mapping unit applies a unit-specific de-mapping code matrix to the M wire-mapped signal components associated with the corresponding OFDM subcarrier to generate M subcarrier-specific symbols, one for each of the M de-mapped signal streams.

The transmission and reception systems of the present invention may further be collectively used in a repeater disposed between a remote transmission system and a remote reception system, where the repeater is part of a curbside distribution box and is designed to distribute signals intended for multiple households received via a large multi-wire cable between smaller multi-wire cables intended for the individual households. In particular, the reception system in the repeater processes signals received via a large multi-wire cable as described above to generate a de-mapped signal stream corresponding to each incoming wire. The repeater comprises a transmission system for each outgoing multi-wire cable. Each transmission system process the de-mapped signal streams intended for a particular household, and therefore associated with a particular outgoing multi-wire cable, as described above to generate transmission signals for transmission along the corresponding multi-wire cable.

To better understand the details of the present invention, the following first describes the details of and problems associated with a current multi-wire cable communication system. Wire line telephone companies typically install multi-wire cables comprising more twisted-wire pairs of wires than are actually used by the end location. More particularly, a cable drawn underground by machine has to have a certain strength to withstand the installation process that is generally not provided by a single pair cable. To address this issue and/or to provide spare wires for potential future services and/or in case of wire failure, wire line telephone companies in the U.S.A. typically install cables comprising five twisted pairs of wires between curbside distribution boxes and the end location, e.g., a home, even though conventional telephone operations typically rely only on one or two of the twisted pairs in the cable.

An exemplary Network Interface Box (NIB) attached to the side of a home typically terminates the cable drawn from a curbside distribution box to the home and interfaces with the home wiring. In general, the input cable for an NIB includes five twisted pairs of wires, of which only two twisted pairs are actually utilized for two telephone numbers, with DSL service provided by one of the twisted pairs.

An exemplary curbside distribution box comprises twenty-five pairs of wires from a single underground cable connected to the curbside box, where the twenty-five pairs are split between five homes using five household-specific cables, each comprising five twisted-pairs of wires. It will be appreciated that the utilized twisted pairs in both the large multi-wire cable and the smaller household-specific cables are inactive most of the time, as not all people are at home or using communications services simultaneously at all times.

It is one objective of the present invention to permit the existing copper wires connected to a home via the NIB to deliver data rates adequate to support a handful of remotely-selected high data rate TV programs, e.g., HDTV programs, to each home, thereby supporting viewing of different HDTV programs in each of several rooms of each home, and allowing the wire line company to compete effectively as a supplier of bundled services. A service such as TV would be expected to use the cable more continuously than say telephone or Internet services, but nevertheless, when averaged over a sufficient number of homes, the average "Erlang loading" factor is expected be somewhat less than the peak traffic rate offered, thereby providing some statistical multiplexing gain.

One way to provide higher data rates to a home is to provide L parallel DSL streams using L twisted pairs of wires. However, the performance provided by such a configuration is hampered by a number of factors, including the crosstalk from one signal to another and the high noise level present on the lines, typically 33 dB above thermal noise.

Currently existing DSL modems decode signals independently for each twisted pair, and thus cannot easily compensate for crosstalk due to the presence of another signal in an adjacent twisted pair. The inability to easily compensate for crosstalk is caused by the fact that, currently, separate DSL signals terminate in different subscriber's homes, which makes it difficult for the two separate DSL modems to collaboratively decode the two signals. Other systems address this problem by providing a modem that jointly decodes several DSL signals at the same subscriber location. In this case, delivery of L DSL signals to the home using L twisted pairs of wires, and jointly decoding them to compensate for crosstalk, is known as "bonding". However, bonding only works at the curbside distribution box, after which the subscriber cable may be spliced into a larger cable containing DSL signals for other subscribers, which cannot therefore be jointly decoded. In addition, current technology does not exploit the fact that noise on the cable may be highly correlated between different pairs or different wires.

The present invention deals effectively with correlated noise in order to improve performance, by contemplating a new type of modem referred to herein as an "Orthogonal Vector DSL modem" that decodes a number of parallel DSL streams jointly, with substantial removal of crosstalk and noise correlated between different wires. The issue of splicing of subscriber cables into larger cables is dealt with by contemplating active circuitry, referred to herein as a repeater, at the splicing point, e.g., the curbside distribution box. The active circuitry re-multiplexes and reforms the signals received from different subscribers into a form adapted to the larger cable, and vice versa.

The invention goes beyond providing L parallel DSL streams on L twisted pairs of wires, however, which although contemplated in the prior art, is rendered inoperable when splicing with non-jointly decoded signals occurs. Instead, the present invention makes use of the fact that M=2 L wires can support M independent transmission signals, where one of the independent transmission signals is derived from a common mode signal that is not useful for traffic without a good ground return, such as an outer sheath. Because existing underground cables do not possess such an outer sheath, the use of a common mode signal for traffic data is not possible. However, the common mode signal can reveal correlated noise, and may thus be processed at the receiver with some benefit. The remaining M−1 signals may support M−1 parallel DSL signals. In general, the present invention generates M transmission signals from M input signals, including a null input signal, for transmission along M wires, where the M wires do not necessarily comprise twisted pairs of wires, and where M is not necessarily an even number.

FIG. 1 first shows a prior art concept of traditional wire line telephony called "Phantom Circuits". FIG. 1 shows a multi-wire cable comprising a first balanced line 20 comprising a first pair of wires 22-1, 22-2 that provides a first connection for a first communications channel, while a second balanced line 24 comprising a second pair of wires 26-1, 26-2 provides a second connection for a second communications channel. At each end of each balanced line 20, 24, balanced-to-unbalanced transformers 10, 12, 30, 32 connect the balanced lines 20, 24 to an unbalanced source or load, such as a Plain Ordinary Telephone (POT) for signals $S_1$, $S_2$. A third circuit may be formed between the center taps of transformers 10, 12 to the center taps of transformers 30, 32 and used to carry a third signal $S_3$, which does not mix with signals $S_1$ or $S_2$ as long as the transformer center taps provide accurate balance, which is practically possible.

The third communication channel effectively uses the two wires of each balanced line in parallel, e.g., in-phase, to form a third balanced line. In the case where the first two balanced lines 20, 24 comprise twisted pairs of wires, lines 20, 24 could be further twisted one with the other so that the phantom circuit also effectively uses a twisted pair for the third balanced line. Phantom circuits are seldom, if ever, used today, mainly because a phantom circuit requires access to the center taps of the line transformers in the subscriber's equipment, making it difficult to offer the three circuits to different subscribers. This is not an issue with the present invention, as all such circuits will be used by the same subscriber to obtain a higher data rate. It is noteworthy that the loop resistance of a phantom circuit is half that of the twisted pair circuits. Analysis shows that, when used for DSL signals, the attenuation per kilometer versus frequency characteristics are therefore superior for the phantom circuits over the conventional circuits, and can therefore provide higher data rates as well as more parallel circuits.

Figure 2:
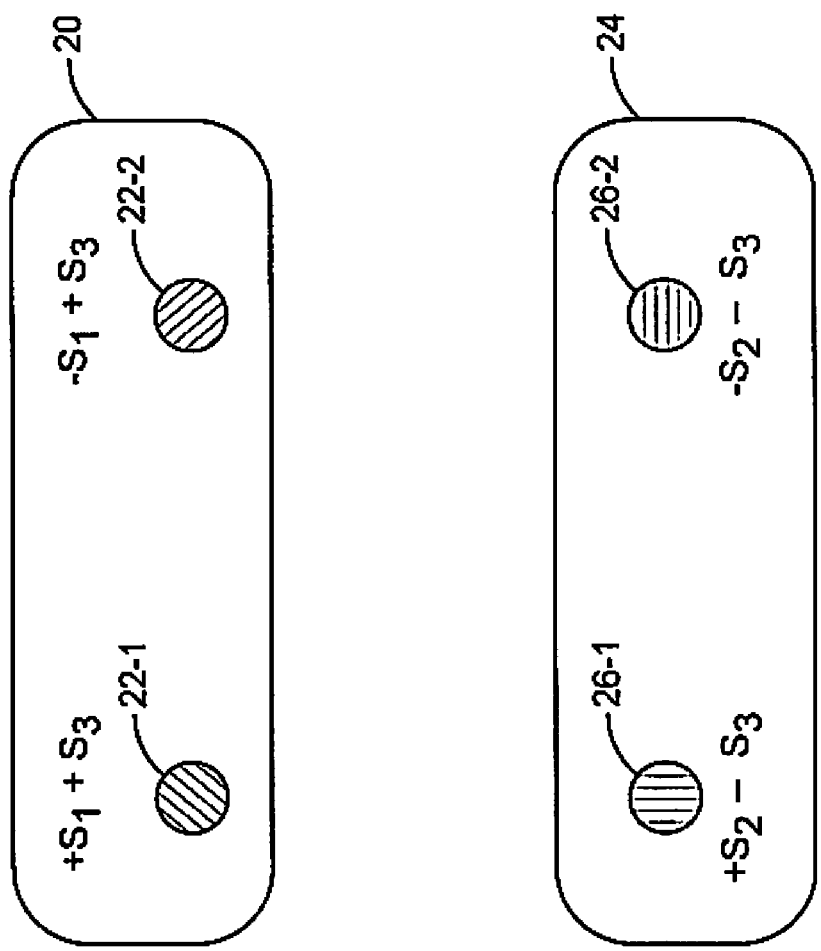
FIG. 2 shows the signal combinations present on each wire of the phantom circuit.

FIG. 2 shows how the three signals $S_1$, $S_2$, and $S_3$ are supported on the four wires of the conventional phantom circuit. Wire 22-1 of line 20 carries $S_1+S_3$, while wire 22-2 of line 20 carries $-S_1+S_3$. For line 24, wire 26-1 carries $S_2-S_3$, while wire 26-2 carries $-S_2-S_3$. This signal arrangement constructs three orthogonal modes on the four wires, all of which are "push-pull" or balanced modes because they use $\pm S_1$, $\pm S_2$ and $\pm S_3$. A fourth mode in which all wires are driven in phase would also be orthogonal to these three, but cannot be used unless a fifth wire is added as a ground return for that fourth mode.

As shown by FIGS. 1 and 2, the phantom circuit of the prior art does not use all wires equally for its three circuits. As a result, the transmission signals applied to each wire do not comprise combinations of all three input signals. More particularly, $S_1$ and $S_2$ only appear on two of the four wires each, while $S_3$ appears on all four wires. Moreover, the loop resistance for the $S_3$ circuit is half the loop resistance $S_1$ and $S_2$ circuits, which can result in significantly lower line loss for that mode.

Figure 3:
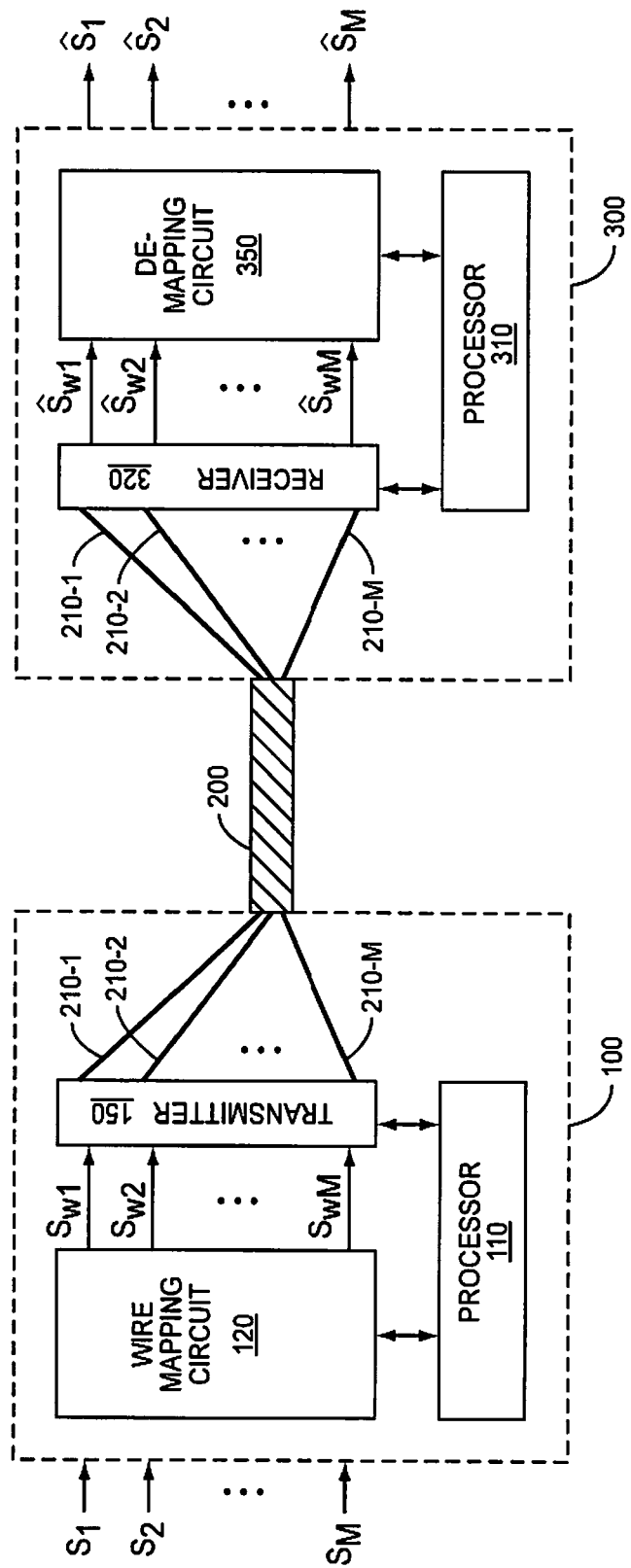
FIG. 3 shows a transmission and reception system coupled by a multi-wire cable according to one embodiment of the present invention.

FIG. 3 shows a communication system for the present invention that maps different combinations of all input signals to different wires in a multi-wire cable 200 to increase the data rate available with copper wire infrastructures. The communication system of FIG. 3 comprises a transmission system 100, a multi-wire cable 200 comprising M wires, and a reception system 300. Transmission system 100 maps different combinations of each of M input signals $S_1, S_2, \ldots S_M$ onto different wires 210 in the multi-wire cable, while the reception system 300 de-maps the M received signals to generate M estimates $\hat{S}_1, \hat{S}_2, \ldots \hat{S}_M$ of the original input signals. More particularly, transmission system 100 comprises a processor 110, wire-mapping circuit 120, and a transmitter 150. Processor 110 controls the operation of the transmitter. Wire-mapping circuit 120 applies a wire-mapping code matrix to the input signals $S_1, S_2, \ldots S_M$ to generate wire-mapped signals $S_{w1}, S_{w2}, \ldots, S_{wM}$, one for each of the M wires such that each wire-mapped signal $S_{wm}$ comprises a different combination of all of the input signals. Transmitter 150 generates the transmission signals from the wire-mapped signals and transmits a different signal on each wire 210.

The wires 210 connected to transmitter 150 are bundled into a multi-wire cable that connects the wires 210 to the reception system 300 at the other end. Reception system 300 comprises a processor 310, receiver 320, and de-mapping circuit 350. Processor 310 controls operation of the reception system 300. Receiver 320 receives a signal from each wire and estimates the wire-mapped signals $\hat{S}_{w1}, \hat{S}_{w2}, \ldots, \hat{S}_{wM}$, one for each wire. De-mapping circuit 350 applies a de-mapped code matrix to the wire-mapped signals to generate de-mapped symbol streams $\hat{S}_1, \hat{S}_2, \ldots, \hat{S}_M$ such that each de-mapped symbol stream comprises a different combination of all of the input wire-mapped signal estimates. Ideally, the de-mapped symbol streams $\hat{S}_1, \hat{S}_2, \ldots, \hat{S}_M$ approximate the input signals $S_1, S_2, \ldots S_M$ applied to the transmission system 100 at the other end.

The mapping matrices applied by the wire-mapping circuit 120 and de-mapping circuit 350 create different combinations of all of the signals input to the corresponding circuit. Each combination represents one mode, where the modes are orthogonal in some embodiments. For simplicity, the following discusses the wire-mapping code matrix, but it will be appreciated that the same logic applies to the de-mapping code matrix.

Figure 4:
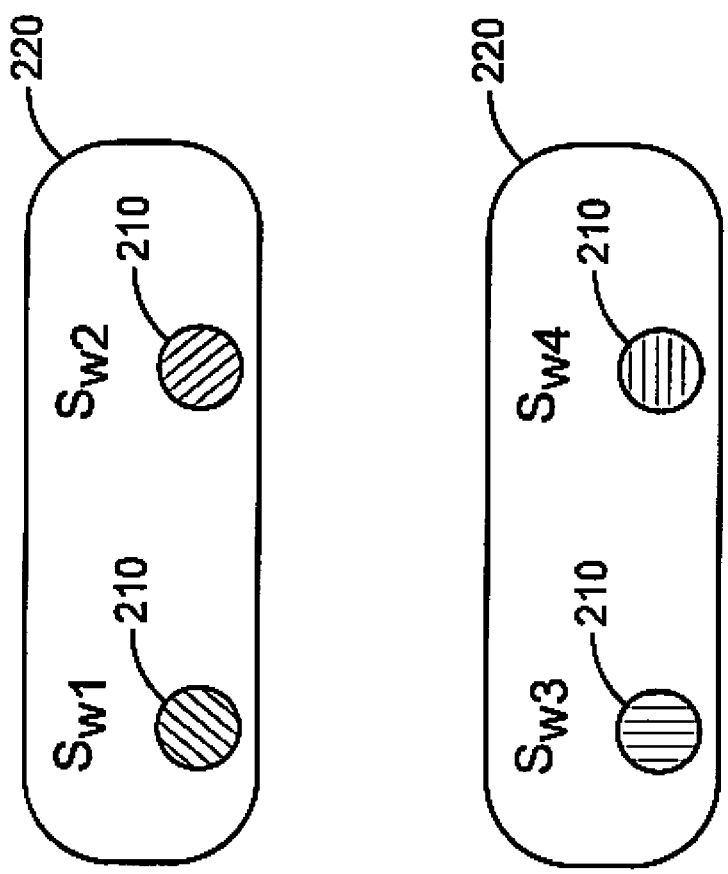
FIG. 4 shows the signal combinations present on each wire of the multi-wire cable of FIG. 3 for one exemplary wire-mapping circuit of the present invention.

Consider an example where M=4 and the wire-mapping matrix comprises a Walsh-Hadamard code matrix. The wire mapped signals $S_{w1}$, $S_{w2}$, $S_{w3}$, $S_{w4}$ generated by the wire-mapping circuit 120 for the four wires 210 are:

$$S_{w1}=S_1+S_2+S_3+S_4$$

$$S_{w2}=S_1+S_2-S_3-S_4$$

$$S_{w3}=S_1-S_2+S_3-S_4$$

$$S_{w4}=S_1-S_2-S_3+S_4 \quad (1)$$

when the wire-mapping code matrix comprises a Walsh-Hadamard code matrix, where $S_{w1}$ represents the common mode. Each wire-mapped signal is supported by one of the four wires (two twisted pairs) as shown in FIG. 4. As shown in FIG. 4, input signal $S_1$ drives all four wires in phase, and therefore would create a net current flow, which cannot be supported without a ground return. Thus, input signal $S_1$ is set to zero so that it comprises a null signal. It will be appreciated that $S_1$ is included for completeness and to facilitate a mathematical description of the invention. The other three input signals, $S_2$, $S_3$, $S_4$ are all present in positive and negative versions on an equal number of wires, and thus are supported without a ground return because no net current flows in or out of the cable ends for these signals.

Walsh-Hadamard codes exist only for a number of wires equal to a power of 2. In order to achieve greater generality, Fourier Codes may alternatively be used. Fourier Codes of length M are constructed by progressively rotating a unit vector through a phase angle of $2\pi/M$ or multiples thereof, including zero (for $S_1$), thereby obtaining M orthogonal codes, which are complex-valued. Complex-valued codes can be applied to signals that are complex-valued, such as the modulated values of OFDM subcarriers. For M=4, the phase progressions are 0, 90°, 180°, and 270°. The Fourier matrix coefficients are thus [1 1 1 1] for 0° phase progression, [1 j − 1 −j] for 90° phase progression, [1 −1 1 −1] for 180° phase progression, and [1 −j −1 j] for 270° phase progression. As a result, the wire-mapped signals $S_{w1}$, $S_{w2}$, $S_{w3}$, $S_{w4}$ generated for the four wires 210 when the wire-mapping code matrix comprises a Fourier matrix are:

$$S_{w1}=S_1+S_2+S_3+S_4$$

$$S_{w2}=S_1+S_2-S_3-S_4$$

$$S_{w3}=S_1-jS_2+S_3-jS_4$$

$$S_{w4}=S_1-jS_2-S_3+jS_4 \quad (2)$$

These wire-mapped signals may also be supported by four wires (two twisted pairs) as shown in FIG. 4. The strategy for applying particular wire-mapped signals to particular wires is discussed further below.

The above broadly discusses the transmission and reception systems of FIG. 3 relative to transmission signals having a single frequency band. However, it will be appreciated that the present invention also applies to transmission signals comprising multiple subcarriers or subcarrier groups, e.g., OFDM transmission signals that comprise a plurality of OFDM subcarriers.

Figure 5A:
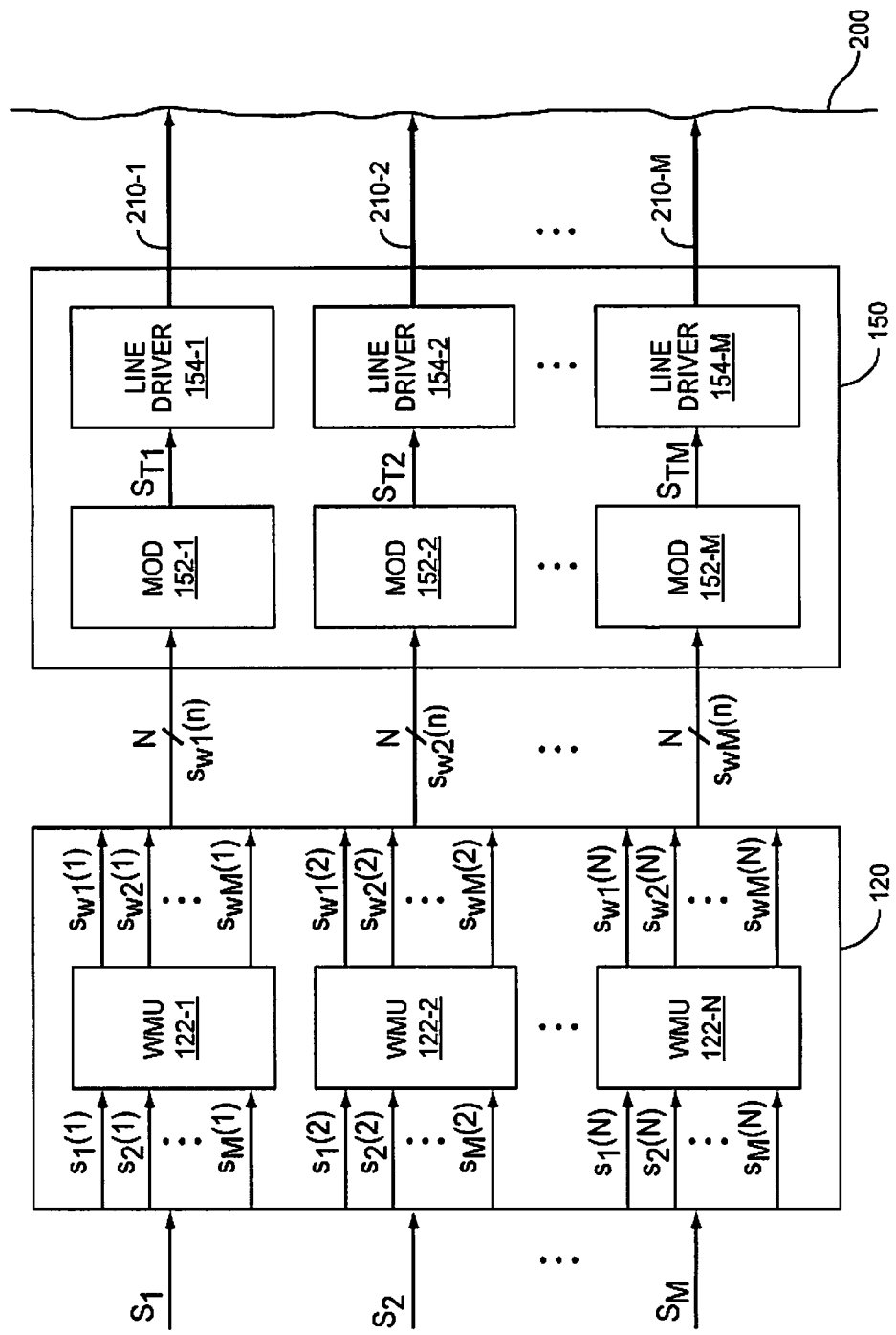
FIGS. 5A and 5B show additional details of the transmission and reception systems, respectively, of FIG. 3 according to one exemplary embodiment.
Figure 5B:
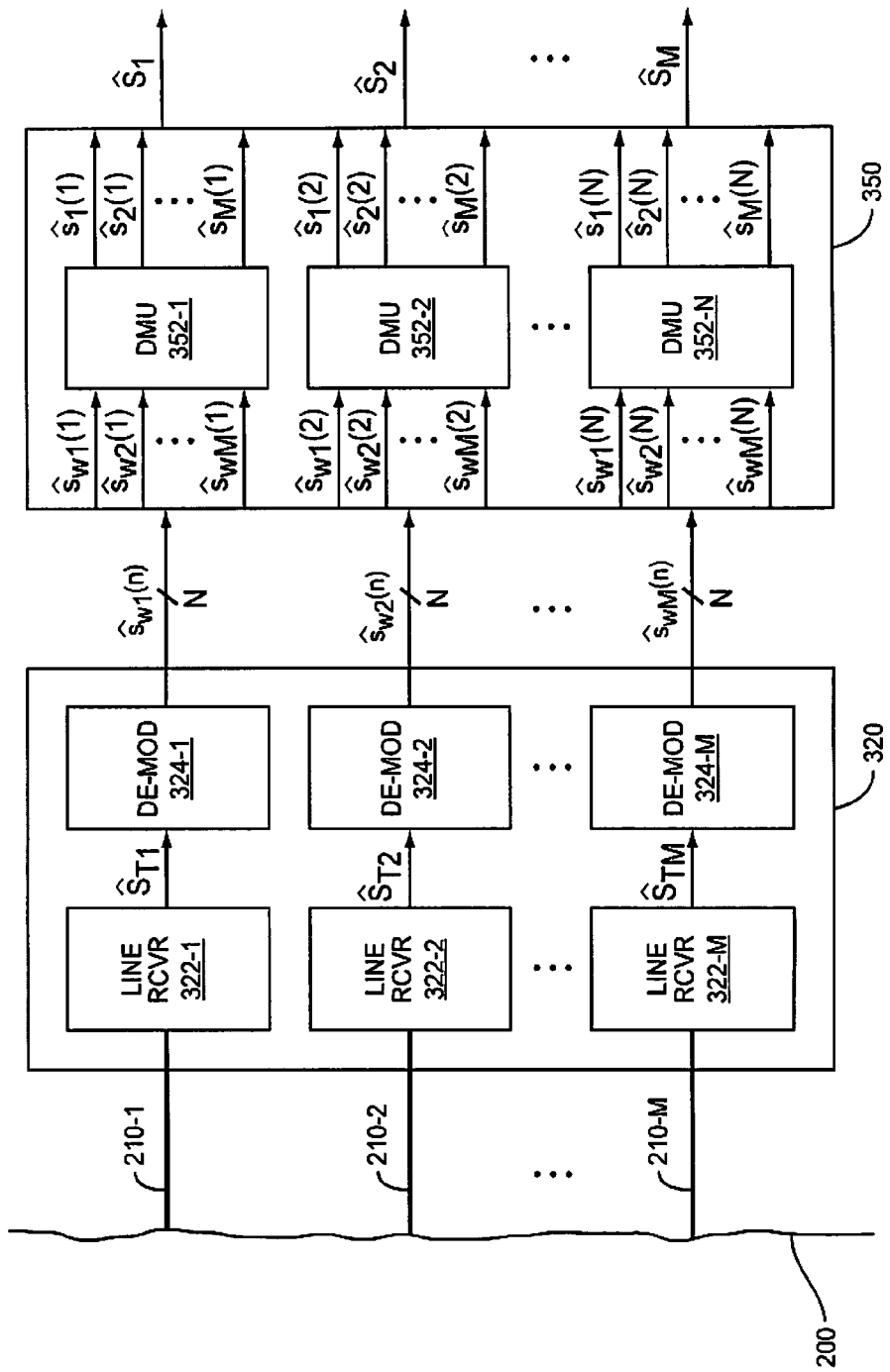

FIGS. 5A and 5B show block diagrams of exemplary transmission and reception systems 100, 300 that accommodate input signals comprising a plurality of symbols, each associated with a different subcarrier or subcarrier group. A multi-carrier transmission system 100 according to one embodiment of the present invention comprises a wire-mapping circuit 120 comprising a wire-mapping unit 122 for each subcarrier or subcarrier group, and a transmitter 150 comprising a modulator 152 and line driver 154 for each wire 210 of the multi-wire cable 200. A first vector of data symbols associated with a first subcarrier $s(1)=(s_1(1), s_2(1), \ldots, s_M(1))$, where M represents the number of input signals, are input to the wire-mapping unit 122-1 corresponding to the first subcarrier. Wire-mapping unit 122-1 applies a unit-specific wire-mapping code matrix to the corresponding first subcarrier symbols onto the mapping codes. The result comprises a wire-mapped signal vector associated with a first subcarrier $s_w(1)=(s_{w1}(1), s_{w2}(1), \ldots, s_{wM}(1))$. It will be appreciated that both the input symbol vector s and the wire-mapped signal vector $s_w$ may be complex. Similarly, each of the remaining wire-mapping units 122-2 to 122-N apply the corresponding unit-specific wire-mapping code matrix to the subcarrier-specific symbol vectors $s(n)=(s_1(n), s_2(n), \ldots, s_M(n))$ associated with the corresponding subcarrier onto to generate the corresponding wire-mapped signal vector $s_w(n)$. Thus, wire-mapping circuit 120 outputs N wire-mapped signal vectors $s_w(n)=(s_{w1}(n), s_{w2}(n), \ldots, s_{wM}(n))$, one for each of the N OFDM subcarriers, each of which includes a wire-mapped signal component for each wire.

Subsequently, a first modulator 152-1 in the transmitter 150 applies an N-point IFFT to the wire-mapped signal associated with the first wire 210-1, which comprises the subcarrier-specific components of the wire-mapped signal vectors that correspond to the first wire, e.g., $S_{w1}=(s_{w1}(1), s_{w1}(2), \ldots, s_{w1}(N))$, to obtain a modulated waveform for the first wire, e.g., $S_{T1}=(s_{T1}(1), s_{T1}(2), \ldots, s_{T1}(N))$, where $s_{T1}(n)$ represents a transmission waveform sample corresponding to the $n^{th}$ subcarrier. Similarly, the remaining modulators 152-2 to 152-M apply the IFFT process to the corresponding wire-mapped signals to obtain a modulated waveform for each wire, each modulated waveform comprising a waveform sample for each subcarrier. When the waveform samples are complex, each modulated waveform is then quadrature modulated by combining the real parts multiplied by a set of N cosine waveform samples with the imaginary parts multiplied by a set of N sine waveform samples, which may be part of line driver 154, thereby obtaining a transmission signal for the corresponding wire that can be digital-to-analog converted and applied to the assigned wire. Many details, such as the need or not for a cyclic prefix, anti-aliasing filtering, etc., have been omitted for simplicity, but are well known in the art of OFDM.

An OFDM reception system 300 performs similar OFDM operations in reverse. An exemplary OFDM reception system 300, shown in FIG. 5B, comprises a receiver 320 and a de-mapping unit 350. Receiver 320 comprises a line receiver 322-$m$ and demodulator 324-$m$ for each of the M wires 210-$m$. The signal received via the first wire 210-1 is processed by line receiver 322-1 and demodulator 324-1 as discussed above to estimate a wire-mapped signal $\hat{S}_{w1}=(\hat{s}_{w1}(1), \hat{s}_{w1}(2), \ldots, \hat{s}_{w1}(N))$ for the first wire. The remaining line receiver 322-$m$ and demodulator pairs 324-$m$ each similarly process the signal received via the corresponding wire 210-$m$ to estimate a wire-mapped signal $\hat{S}_{wm}=(\hat{s}_{wm}(1), \hat{s}_{wm}(2), \ldots, \hat{s}_{wm}(N))$ for the corresponding wire 210-$m$.

The wire-mapped signal components corresponding to the first subcarrier are grouped into a wire-mapped signal vector $\hat{s}_w(1)=(\hat{s}_{w1}(1), \hat{s}_{w2}(1), \ldots, \hat{s}_{wM}(1))$. The wire-mapped signal vector for the first subcarrier is applied to the first de-mapping unit 352-1 of the de-mapping circuit 350. The de-mapping circuit 350 applies the unit-specific de-mapping matrix to the input wire-mapped signal vector to estimate a de-mapped symbol associated with the first subcarrier for each wire. The remaining wire-mapping units 352-$m$ similarly apply a unit-specific de-mapping matrix to the corresponding wire-mapped signal vectors $\hat{s}_w(n)=(\hat{s}_{w1}(n), \hat{s}_{w2}(n), \ldots, \hat{s}_{wM}(n))$ to estimate the de-mapped symbols for the corresponding subcarrier for each wire. As a result, the de-mapping circuit 350 generates a de-mapped symbol stream $\hat{S}_m$, one for each wire, where each de-mapped symbol stream includes a de-mapped symbol for each subcarrier.

As mentioned above, a signal-to-wire assignment strategy may be used to facilitate the crosstalk and noise reduction efforts of the present invention. For example, the strategy for the signal-to-wire assignment of FIG. 4, which is discussed mathematically later, selects pairs of signal combinations to occupy the two wires of the same twisted pair such that the wire-mapped signal components of the selected signals are present as nominal in-phase versions or as nominal 180° out-of-phase versions. Thus, $S_{w1}=S_1+S_2+S_3+S_4$ is assigned to one wire 210 of a twisted pair 220, while $S_{w2}=S_1-S_2+S_3-S_4$ is assigned to the other wire 210 of the same twisted pair 220 because the like components of $S_{w1}$ and $S_{w2}$ are either nominally in phase or nominally out of phase. For example, signals $S_1$ and $S_3$ of $S_{w1}$ and $S_{w2}$ are nominally in-phase on the two wires 210 of the same twisted pair 220, while $S_2$ and $S_4$ of $S_{w1}$ and $S_{w2}$ are nominally 180° out of phase on the two wires 210 of the same twisted pair 220. Had instead the two combinations $S_{w1}=S_1+S_2+S_3+S_4$ and $S_{w4}=S_1+jS_2-S_3-jS_4$ been assigned to the same wires 210 of a twisted pair 220, signal $S_2$ would be nominally 90° out-of-phase on the two wires 210 of the same twisted pair 220. Likewise, $S_4$ would be nominally 90° out of phase on the two wires 210 of the same twisted pair 220. There is thus a difference in the propagation characteristics of the signals depending on the signal-to-wire assignment. As discussed further below, the present invention may include determining an optimum assignment, which can be carried out electronically within the processor 110 or manually during a setup procedure.

Figure 6:
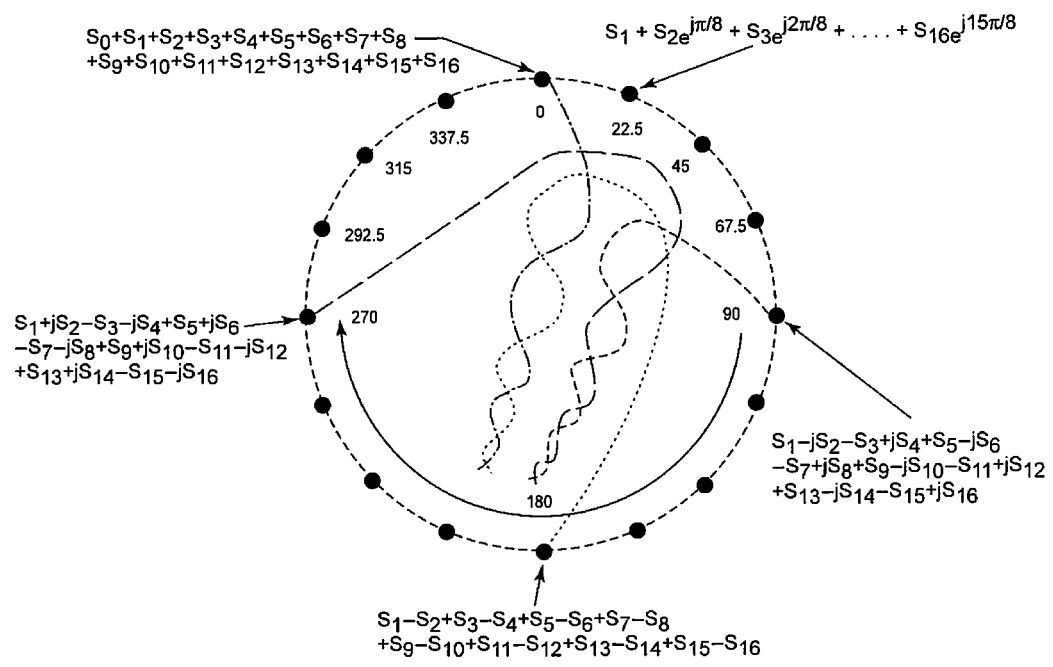
FIG. 6 shows an exemplary protocol for assigning different transmission signals to different wires.

The assignment strategy used for FIG. 4 may be used for any number of wires. For example, FIG. 6 shows a partial arrangement for assigning sixteen wire-mapped signals derived from sixteen input signals to sixteen wires comprised of eight twisted pairs. The 16 Fourier codes are written around a circle corresponding to the progressive phase angle used to generate them. Thus, the combination $S_1+S_2+\ldots+S_{15}$, which uses a 0° phase progression and corresponds to the common mode, is shown at 0° (twelve o'clock), the combination $S_1+jS_2-S_3-jS_4+S_5+jS_6\ldots-jS_{15}$ for the 90° phase progression is shown at 90° around the circle (three o'clock), etc. To obtain the desired nominally in phase/180° out of phase relationships, the wires in the same twisted pair of wires will generally be assigned to wire-mapped signals on opposing portions of the circle. For example, when the transmission signal derived from the wire-mapped signal with the 0° phase progression is assigned to one wire in a twisted pair, the other wire in the same twisted pair may be assigned to the transmission signal derived from the wire-mapped signal with the 180° phase progression. Similarly, when the transmission signal derived from the wire-mapped signal with the 45° phase progression is assigned to one wire in a twisted pair, the other wire in the same twisted pair may be assigned to the transmission signal derived from the wire-mapped signal with the 225° phase progression. The same strategy may be used for the remaining wires 210 in the cable 200.

Further, there may be an aspect of the wire-assignment strategy that decides which twisted pair in a bundle is best to use for a given diametrically opposite pair of signals. In some cases, the signal-to-wire assignments may be determined in advance and implemented mechanically. In other embodiments, the signal-to-wire assignments may be determined according to some mathematical algorithms that analyze test signals, and implemented electronically within processor 110, 310 without the need for rewiring or electromechanical switching components such as relays. Such an electronic signal-to-wire assignment is possible whenever there is a whole number of integral wire-pairs. If a wire fault should occur leaving an odd-number of integral wires, a departure from the above-described assignment strategy may be made wherein Fourier combinations that are almost diametrically opposite are allocated to each integral twisted pair, and the remaining combination allocated to the remaining wire. For example, if ten Fourier combinations of input signals were applied to a five-pair cable, where the wire-mapping circuit 120 for this example comprises a ten-point DFT, e.g., configured as a (5×2) point FFT, upon failure of one wire, the remaining nine wires can be used to carry the nine combinations of a nine-point DFT, configured as a (3×3)-point FFT. Even when the DFT size is prime, faster methods of computation are available using the Winograd formulation. It can also be chosen to omit use of the other wire of the faulty pair; however, both the faulty wire and any other omitted wire may still be used at the reception system 300 to give clues about correlated interference on the remaining, signal-carrying wires.

A mathematical analysis of the propagation of vectorized signals, e.g., $S_1, S_2, S_3, S_4$ of FIG. 4 or $S_1, S_2, S_3, \ldots, S_{16}$ of FIG. 6, which mathematically supports the above-described assignment strategy will now be carried out. Assume a single transmission wire has an impedance per unit length $Z=R+j\omega L$ and an admittance per unit length of $Y=G+j\omega C$, where R represents a resistance per unit length, L represents an inductance per unit length, G represents a shunt loss conductance per unit length (usually negligible), and C represents a capacitance per unit length. The differential equations for the propagation of current and voltage in a direction x along the transmission wire are:

$$\frac{dV}{dx} = -ZI, \text{ and} \qquad (3)$$

-continued $$\frac{dI}{dx} = -YV, \quad (4)$$

where Equation (3) reflects the loss of voltage per unit length, and Equation (4) reflects the loss of current gain per unit length. These are solved by differentiating Equation (3) again to get:

$$\frac{d^2V}{dx^2} = -Z\frac{dI}{dx}, \quad (5)$$

and substituting for dI/dx from Equation (4) to obtain:

$$\frac{d^2V}{dx^2} = (ZY)V. \quad (6)$$

The solution to Equation (6) is:

$$c_1 e^{\sqrt{(ZY)}x} + c_2 e^{-\sqrt{(ZY)}x}, \quad (7)$$

which represents waves traveling forwards and backwards, respectively, the complex constants $c_1$, $c_2$ being determined by applying the boundary conditions at the cable ends for each frequency ω. A propagation constant is represented by $\gamma = \sqrt{ZY}$, which is completely imaginary in the case R=G=0, so that the complex exponentials describe only a propagation phase shift per unit length but no propagation loss. If R or G is non-zero however, the propagation constant will have a real part describing the loss per unit length.

The above analysis is for a single transmission line with a ground return. This theory is now extended for the vector case. We now have a vector of M voltages V and M currents I present on M transmission wires, and a ground return is assumed, even though it will not ultimately be used. Now the loss of voltage per unit length due to current flow is described by the matrix equation:

$$\frac{dV}{dx} = -[Z]I, \quad (8)$$

where $[Z]=[R]+j\omega[L]$ comprises an M×M matrix of impedance per unit length, and the loss of current per unit length is described by:

$$\frac{dI}{dx} = -[Y]V, \quad (9)$$

where $[Y]=[G]+j\omega[C]$ comprises an M×M matrix of admittance per unit length. Using the same procedure as for Equations (3) and (4) obtains:

$$\frac{d^2V}{dx^2} = [Z][Y]V. \quad (10)$$

The nature of the matrices [Z] and [Y] is now determined for the M-wire cable.

Figure 7:
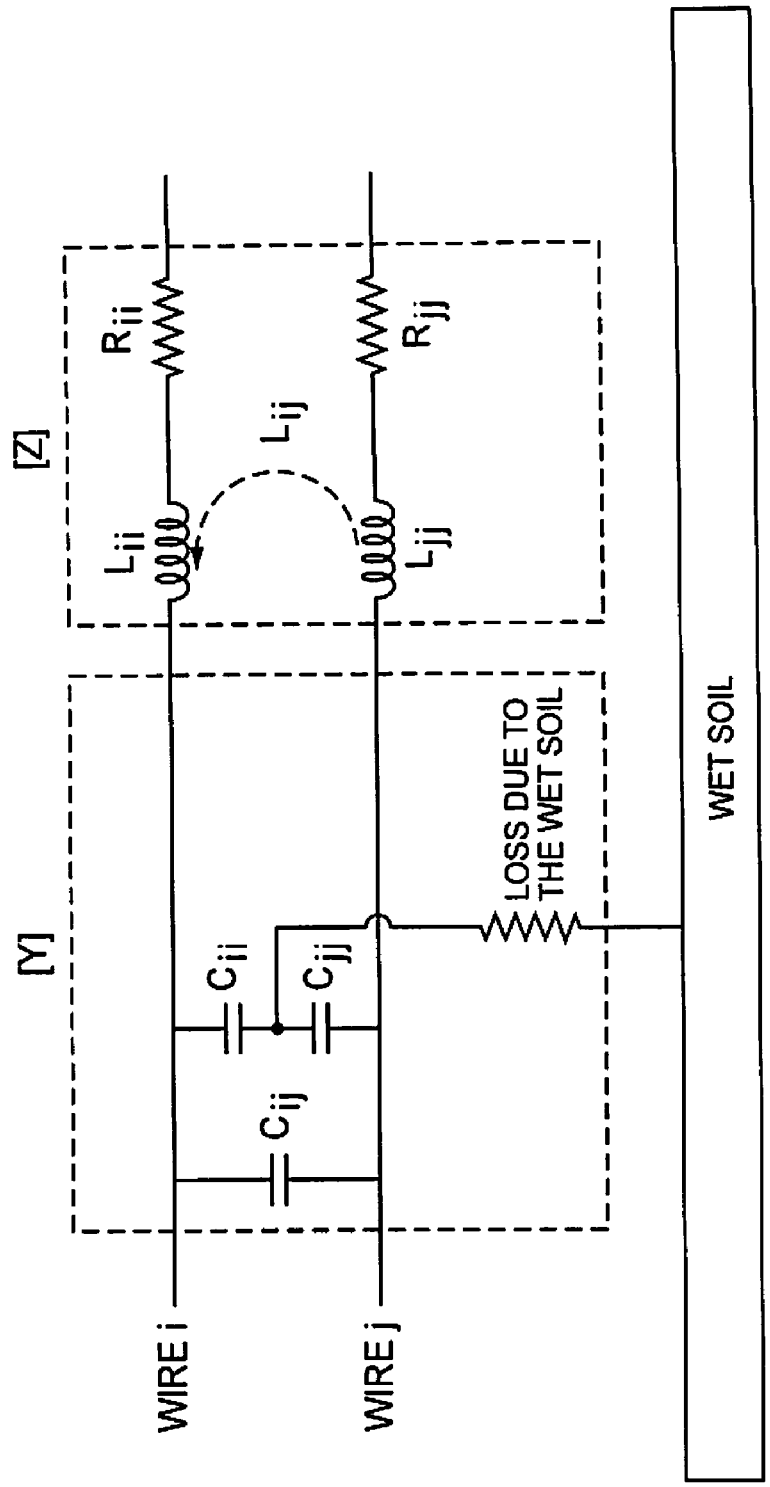
FIG. 7 shows an exemplary model of an underground multi-wire cable.

FIG. 7 shows an equivalent circuit used for a buried multi-wire cable. The admittance matrix [Y] is formed principally from the inter-wire capacitances $C_{ij}$, which will be the greatest when i and j are the two wires of a twisted pair, e.g., between 20 and 30 pF per meter, as they are in proximity for their entire length. The value of $C_{ij}$ for the case where i and j are wires of different twisted pairs is much less, e.g., approximately one fourth of the total capacitance per unit length from one twisted pair to another twisted pair, if they remained adjacent to one another for their entire length. However, as described in "Overview Over Transmission Media I," the weave pattern of a multi-pair cable 200 is deliberately chosen such that the capacitive and inductive coupling from any given wire 210 to any other wire 210, except the other wire of the same twisted pair 220, is the same when averaged over a sufficient length of cable. The capacitance matrix will thus at least nominally comprise equal values $C_{ij}$ except when i and j are the indices of the same twisted pair, or i=j, in which case it describes self capacitance of a wire to the external surroundings. For any twisted pair 220, the self-capacitances are closely matched, but may not be the same values for different twisted pairs, depending on how often a given twisted pair is on the outside of the bunch compared to being on the inside of the bunch. Again, the weave pattern of the cable 200 is often deliberately chosen so that each twisted pair 220 gets the same share of the total length on the outside, where its field is exposed to the lossy ground.

The lossy ground formed by the wet soil around the buried cable 200 is thus modeled by a loss resistance that connects to the junction of all the self capacitances $C_{ii}$, which results in the loss having no effect on balanced signals as long as the capacitances $C_{ii}$ and $C_{jj}$ are the same. Cable specifications give some examples of this capacitance and the imbalance that can be expected.

FIG. 9 shows the nominal capacitance matrix for an 8-pair cable comprising 16 wires. Off-diagonal terms have a negative sign in line with admittance matrix current flow conventions. Multiplication of this matrix by jω in suitable units converts this capacitance matrix to an admittance matrix. The total capacitance from any wire to everything else is 44 pF/m, while the capacitance from any wire to the other wire of the same twisted pair is 22 pF/m. Thus, the capacitance is 33 pF/m (22+(44−22)/2) for the balanced mode on any twisted pair, which corresponds to a characteristic impedance of 125Ω if the velocity factor is 0.8.

The [Y] matrix can thus be computed by computing the [Y] matrix of the capacitors, inverting it, adding the impedance matrix of the soil loss resistance, and then re-inverting to obtain the net admittance matrix, e.g., $$[Y]=[[j\omega C]^{-1}+[R_{loss}]]^{-1}, \quad (11)$$

where $[R_{loss}]$ comprises a 16×16 matrix with every element equal to $R_{loss}$.

The [Z] matrix comprises the line loss resistance part, $[R_{loss}]$, which is simply diagonal. The diagonal values are equal to half the loop resistance per unit length of a twisted pair, and are expected to be accurately equal values for a given cable. The $R_{loss}$ value increases by skin-effect at high frequencies according to a known formula that expresses the AC resistance as a factor times the DC resistance.

The inductance per unit length comprises a self-inductance part $L_{ii}$ or $L_{ij}$ with a mutual inductance part $L_{ij}$. The values ascribed to $L_{ii} L_{1j}$ and correspond to the measured impedance characteristics of each twisted pair, and the impedance of a phantom circuit as shown in FIG. 1. There is a relationship between the capacitance matrix and the inductance matrix under the assumption that all wave modes propagate with substantially the same velocity factor due to the dielectric of the wire insulation being the only factor that causes a speed deviation from the vacuum speed of light. This relationship can be used to determine the inductance matrix from the capacitance matrix of an ideal, lossless cable.

Note that the capacitance matrix of FIG. 8 has the matrix structure known as a cyclic shift matrix. FIG. 9 shows instead a capacitance matrix for a different wire assignment. In FIG. 9, wires 1 and 2 form a first twisted pair; wires 3 and 4 form a second twisted pair, and so forth. It can be seen that the matrix of FIG. 9 is not a cyclic shift matrix. It is, however, a cyclic shift matrix with a scrambled order of columns. The use of the cyclic shift matrix of FIG. 8 without scrambled column order however has a property useful for this invention, namely that the capacitance matrix is diagonalized by the DFT matrix. It is well known that a cyclic shift matrix is diagonalized by the DFT matrix, giving the expressions $[F][C][F]^{-1}=[\Lambda]$ and $[C]=[F]^{-1}[\Lambda][F]$, where $[\Lambda]$ is diagonal. These expressions only arise when the assignment of signals to wires is carried out in accordance with this invention. With other wire assignments such as in FIG. 9, the matrix is not diagonalized by a DFT matrix. It would, however, be diagonalized by a DFT matrix with re-ordered rows and columns, but this is exactly equivalent to changing the wire assignments back to those used for FIG. 8.

The inverse of the cyclic shift matrix is found to be $[C]^-=[F]^-[\Lambda]_{-1}[F]$, which upon division by $j\omega$, is the impedance matrix of the capacitance matrix, and is also a cyclic shift matrix. The loss resistance of the wet ground from the model of FIG. 7 is then added to every element, without destroying its cyclic shift structure. Thus, the inverse admittance matrix may still be diagonalized using DFT matrices and inverted to get a diagonalized admittance matrix $j\omega[\Lambda']$, wherein all the ground loss appears only in term $j\omega\lambda'_{11}=j\omega\lambda_{11}/(1+j\omega\lambda_{11}R_{loss})$, which is the common mode term. The diagonal terms corresponding to the other Fourier modes are unchanged by the ground loss. Substituting for the admittance matrix [Y] in Equation (9), obtains:

$$\frac{dI}{dx} = -j\omega[F][\Lambda'][F]^{-1}V, \quad (12)$$

or $$\frac{d\{[F]^{-1}I\}}{dx} = -j\omega[\Lambda'][F]^{-1}V. \quad (13)$$

Defining $I'=[F]^{-1}I$ and $V'=[F]^{-1}V$ obtains:

$$\frac{dI'}{dx} = -j\omega[\Lambda']V'. \quad (14)$$

Because of the now-diagonal matrix, Equation (14) is separable into an equation of the form of Equation (4) for each of the Fourier modes.

Thus, assigning wire-mapped signals to wires such that the capacitance matrix is a cyclic shift matrix allows the M-wire cable 200 to support independent propagation of M signals $\{V_i'\ I_i'\}$ for $i=1$ to M, with nominally no mutual coupling. The first mode, $i=1$, has an effective admittance per unit length that is lossy due to the surrounding wet earth and is less useful for other than DC or low frequencies; thus, the first mode corresponds to the common mode. The other M−1 modes are however useful for carrying high speed communications signals.

For the M−1 Fourier modes to propagate without mutual coupling, it is also beneficial for the [Z] matrix in Equation (3) to be diagonalized by the same DFT matrix. Even if it is not, it is still possible to diagonalize Equation (10) by writing the matrix [ZY] as $$[E][\Lambda_t][E]^{-1}, \quad (15)$$

where [E] represents a matrix of the eigenvectors of [ZY], allowing Equation (10) to be separated into M equations for modes $i=1$ to M such as:

$$\frac{d^2V_i'}{dx^2} = \lambda_{ii}V_i', \quad (16)$$

where $V=[E]^{-1}V'$. In Equation (16), $\lambda_{1i}$ is the square of the propagation constant for mode (i).

If the matrix [Z] in Equation (8) is also diagonalized by the DFT matrix, then the matrix of eigenvectors [E] above will also be the DFT matrix, and the M Fourier modes will propagate the length of the cable with nominally no mutual coupling. This example will be taken as the baseline case, departures from which, due to cable weaves that do not meet this criterion exactly, being handled by a correction matrix or equalizer in the transmitter, receiver or both.

The inductance matrix for the baseline case can thus be derived by considering the case of a perfectly lossless line, the propagation constants squared of which would be negative real numbers defining a propagation velocity. Moreover, the propagation velocities v for all modes can be assumed to be very close, e.g., equal to 0.8 of the speed of light in vacuum, as the effective dielectric constant is assumed to be the same mix of wire insulation and air space for all modes. Even the common mode can be assumed to have the same propagation constant in the lossless case. Obviously none of the modes can have propagation velocities greater than light, which therefore sets some limits to the possible inductance matrices.

Thus, $[\Lambda_L][\Lambda_C]1/v^2[I]$, where $[\Lambda_L]$ represents the diagonalized inductance matrix, [I] represents the M×M unit matrix, and v represents the propagation velocity in meters per second. Thus, the inductance matrix for an ideal line can be calculated from the capacitance matrix for the ideal line. If the ideal inductance matrix is used, along with the assumptions of homogenous cable construction, the matrix [LC] will be found to be already diagonal, implying that signals on a given wire do not couple to signals on any other wire, even when using unbalanced modes.

The inductance matrix for the non-ideal line is obtained by adding the series loss resistance due to ohmic loss and skin effect at high frequencies. When the lossy impedance and admittance matrices are used, the resulting [ZY] matrix will no longer be diagonal, showing that signals on a single wire do couple to all other wires. However, since all of the inductance, capacitance, [Z], [Y], and [ZY] matrices are diagonalized by the FFT/DFT, propagation of the Fourier Modes still occurs independently and they do not nominally couple.

It will be appreciated that the use of Fourier code signal combinations is only a baseline for the present invention that seems to fit with the nominal characteristics of underground telephone cables. However, upon the herein-contemplated use of further equalizing to reduce Inter-Mode interference, the further equalizing effectively creates wire-mapped signal combinations that differ from the baseline Fourier combinations to any extent required to match a particular cable, which then is using modes that are more generally described as Eigenmodes. The equalizer can adapt the Fourier modes to more accurate Eigenmodes for a particular cable on an OFDM subcarrier-by-subcarrier basis. A simple form of equalizer involves determining the correlations of the signals received on different Fourier modes, or after separation into Eigenmodes, the off-diagonal terms of the correlation matrix, when non-zero, indicating crosstalk. Multiplying the existing Fourier code or Eigenvector matrix at either the receiver or transmitter by the inverse of the correlation matrix corrects it so that the inter-mode crosstalk between subcarriers is annulled. The correlation matrix can alternatively be partitioned into a portion that pre-multiplies the transmitting symbol combiner matrix and a portion that post-multiplies the receiver mode separation matrix. Since cable characteristics are expected to be long-term stable, it is also possible to elect to annul only the largest crosstalk component at any iteration, which simplifies the matrix operations and converges rapidly to the zero inter-mode crosstalk condition.

Using the above analysis, the mode impedances and propagation losses have been computed for an 8-pair cable with the following parameters:

$C_{ij}$ between two wires of the same twisted pair: 22 pF/m;
Average $C_{ij}$ between any other two wires: 1.4 pF/m;
$C_{ii}$ capacitance of a wire to the surrounding ground: 2 pF/m;
DC wire resistance: 0.108 Ω/m;
AC wire resistance=DC Resistance×(wire radius)/(2×skin depth);
Wire radius=0.25 mm
Skin depth=2.11/$\sqrt{f}$ mm, where f represents the frequency of the electric current in kHz
Wet earth loss: 100 μm of cable length For example, at 100 kHz, the mode impedances are found to be:

The common mode (e.g., $S_{w1}$): 2083Ω
NOTE: This is the impedance for the one wire assigned to the common mode, e.g., where all input signals are driven in phase. The impedance of the whole bundle would be $\frac{1}{16}^{th}$ of this value, e.g., 130Ω.
Odd modes (e.g., $S_{wm}$ for odd m≈1): 63Ω
Note: This is the impedance of one wire of any twisted pair for the modes where the input signals are driven in anti-phase. The impedance of a twisted pair would be the impedance of both of its wires in series, e.g., 126Ω.
Even modes (e.g., $S_{wm}$ for even m): 167Ω
NOTE: This is the impedance of one wire for modes where input signals for both wires of all twisted pairs are driven in phase. The impedance of the pair in parallel would be half of this, e.g., 83.5Ω.

Figure 10:
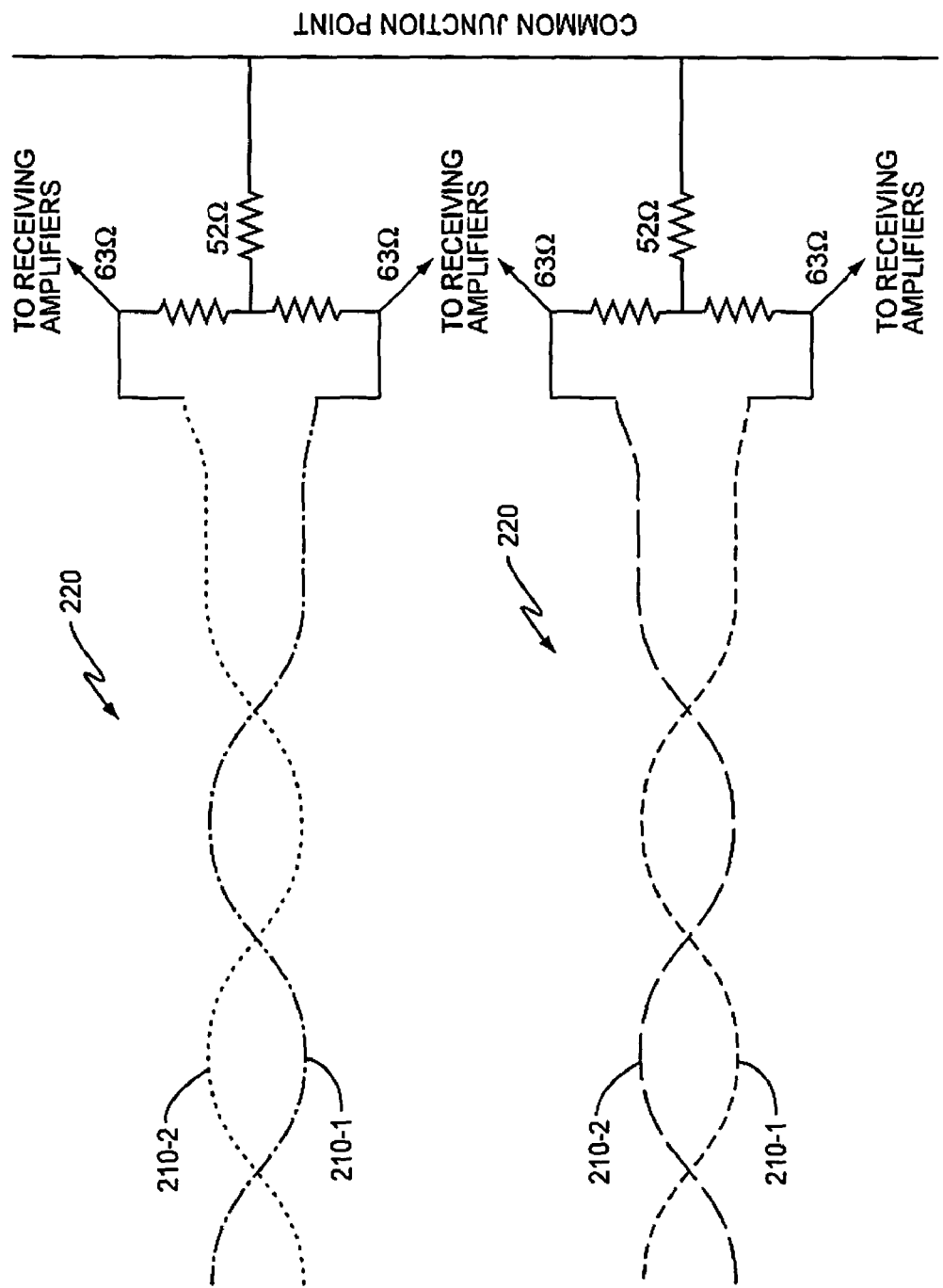
FIG. 10 shows an exemplary termination arrangement for two pairs of wires.

FIG. 10 shows how multi-wire cable 200 can be properly terminated in the correct characteristic impedances for all modes. The odd modes are terminated by the two 63Ω resistors connected across the ends of each twisted pair 220, effectively terminating each twisted pair 220 at its characteristic impedance of 126Ω. If the center tap of the two 63Ω resistors were connected to a zero potential point, the even mode would be terminated at 31.5Ω for both wires 210-1, 210-2 in parallel, or 63Ω each. However, the proper terminating impedance for the even mode was calculated to be 167Ω per wire, or 83.5Ω for both wires in parallel. Therefore, an additional 52Ω connected from the center tap of each pair of 63Ω resistors to a common zero potential point raises the even-mode termination impedance to the correct value. It is suggested that, since the number of different manufacturers, sizes, and types of cables are finite, it would be convenient to prefabricate plug-in, custom termination resistor networks implementing the principles of FIG. 10 for any given cable, so that the optimum termination could be field-installed to match the particular cable at every location.

It is interesting to observe that, even when not practicing Fourier Modes according to this invention, there can still be advantages in using cable terminations as shown in FIG. 10 because balanced signals propagating in non-ideal cables with finite crosstalk will excite waves in the even modes. If these excited waves are not terminated, they will be reflected and couple back into the odd modes. Therefore, terminating the unused even modes can be beneficial even when using cables in a conventional manner. Moreover, as will be further explained later, there can be advantages in receiving the even modes even if only odd modes are transmitted, such as when L DSL signals are transmitted using L twisted pairs. The reason for receiving the even modes also is that sources of cable noise may be revealed by processing the even modes as well as the odd modes, and then subtracting the results to reduce the deleterious effect of cable noise on the data rate, and to thereby allow operation with longer cable lengths or lower transmission power.

Expounding this interference cancellation principle mathematically, if data-carrying symbols $s=s_1 \ldots s_p$ are received using p out of the M orthogonal modes of an M-wire cable, and all M modes receive different amounts of M−p noise or interference signals $y=y_1 \ldots y_{M-p}$, then the following matrix equation can be written for the M received signals $r=r_1 \ldots r_M$ on the M wires:

$$r=[F]s+[Q]y, \qquad (17)$$

where [F] represents the M×p wire-mapping code matrix of Fourier (or Eigenmodes) codes for the p symbols and [Q] represents the M×(M−p) combination of noise sources.

The above is a fully dimensioned set of equations that can be solved for the p symbols and the M−p noise voltages by inverting the M×M matrix [F|Q]. A better method of solution that also utilizes the knowledge that the symbols belong to a finite alphabet, however, is to hypothesize one or more symbols, and then to solve the now over dimensioned equation set for the remainder. The remaining symbols found in this way are then quantized to the nearest symbol in the alphabet, and the noise vector y computed for the combination of the hypothesized and determined symbols using a least squares solution. The residual square error is then used as a measure of the likelihood of the partially hypothesized and partially determined symbol set being correct. This is repeated for all combinations of the hypothesized symbols and the set giving the lowest residual square error is selected. Soft likelihood values may also be derived for the bits of the symbols decoded in this way for further processing in an error-correction decoder.

When the number of independent noise modes is less than M−p, a solution of improved accuracy is obtained by recognizing that Equation (17) would then already be over dimensioned. Thus, it can be understood how wires or modes that do not even carry data are still useful for cancelling correlated noise. The noise correlation matrix [Q] and the number of independent noise modes present can be determined by correlating signals on the wires during an initial setup procedure, and thereafter continuously updated by subtracting correctly decoded data from the received signals to reveal the actual noise voltages. Indeed, knowing decoded symbols and noise voltages, the entire matrix [F|Q] can be checked to see if it needs to be refined to more correctly explain the received signals.

Figure 11:
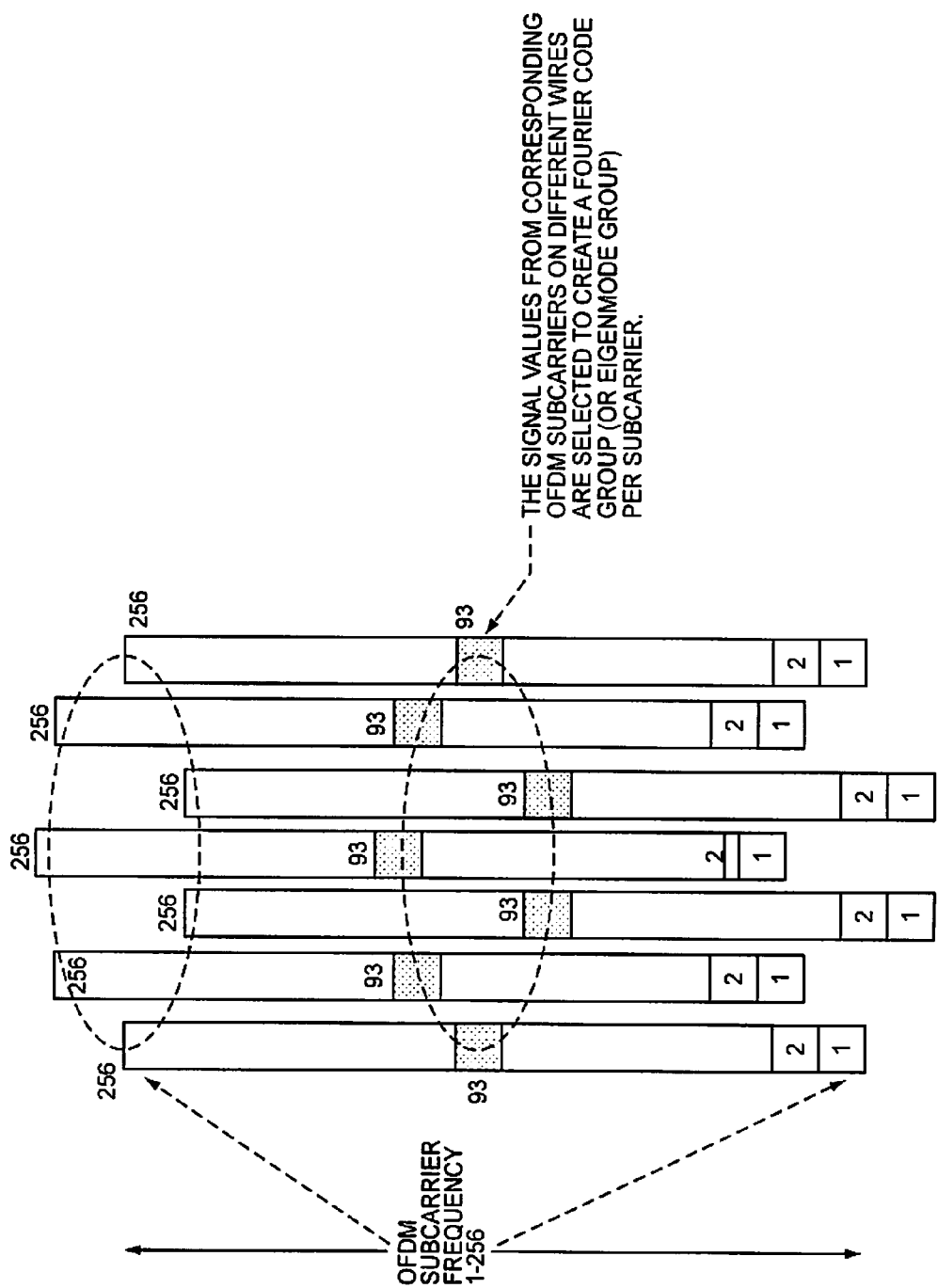
FIG. 11 shows an exemplary Fourier code grouping per OFDM subcarrier.

FIG. 11 shows a collection of M=7 OFDM transmission signals to be applied to M=7 wires. The vertical direction illustrates the N=256 OFDM subcarriers along the frequency domain, numbered 1-256. FIG. 11 demonstrates selecting each set of 7 corresponding subcarriers, e.g., subcarrier index 93, to form a Fourier code group. This allows a 7×7 Fourier matrix to be optimized for each OFDM subcarrier independently by making adjustments as necessary to the elements of the DFT matrix towards a more accurate set of eigenvectors that ensures crosstalk-free transmission for the 7 modes. As mentioned earlier, one of the 7 modes on the 7 wires corresponding to driving all wires in phase, e.g., the common mode, is unusable to carry data without a good ground return, so the symbols coded with the first Fourier code are null symbols. Nevertheless, all seven received signals are useful for interference cancellation to improve the decoding of the 6 symbols carried per OFDM subcarrier. Moreover, it can now be understood how the cancellation of one or more interference sources, as described above can be carried out on a per subcarrier basis, which greatly enhances the possibilities for reducing interference effects. For example, a first medium-wave broadcasting station may interfere in a first way on a first subcarrier or group of subcarriers, which interference may be removed by adapting interference cancellation to the correlation pattern of interference from that station on the 7 wires. A second medium-wave broadcasting station may interfere with a second subcarrier or group of subcarriers in a different way, that is with different correlations across the wires due to the signal hitting the cable from a different direction. Because the interference cancellation can be optimized separately for each subcarrier, the second radio station's interference can also be removed.

Figure 12:
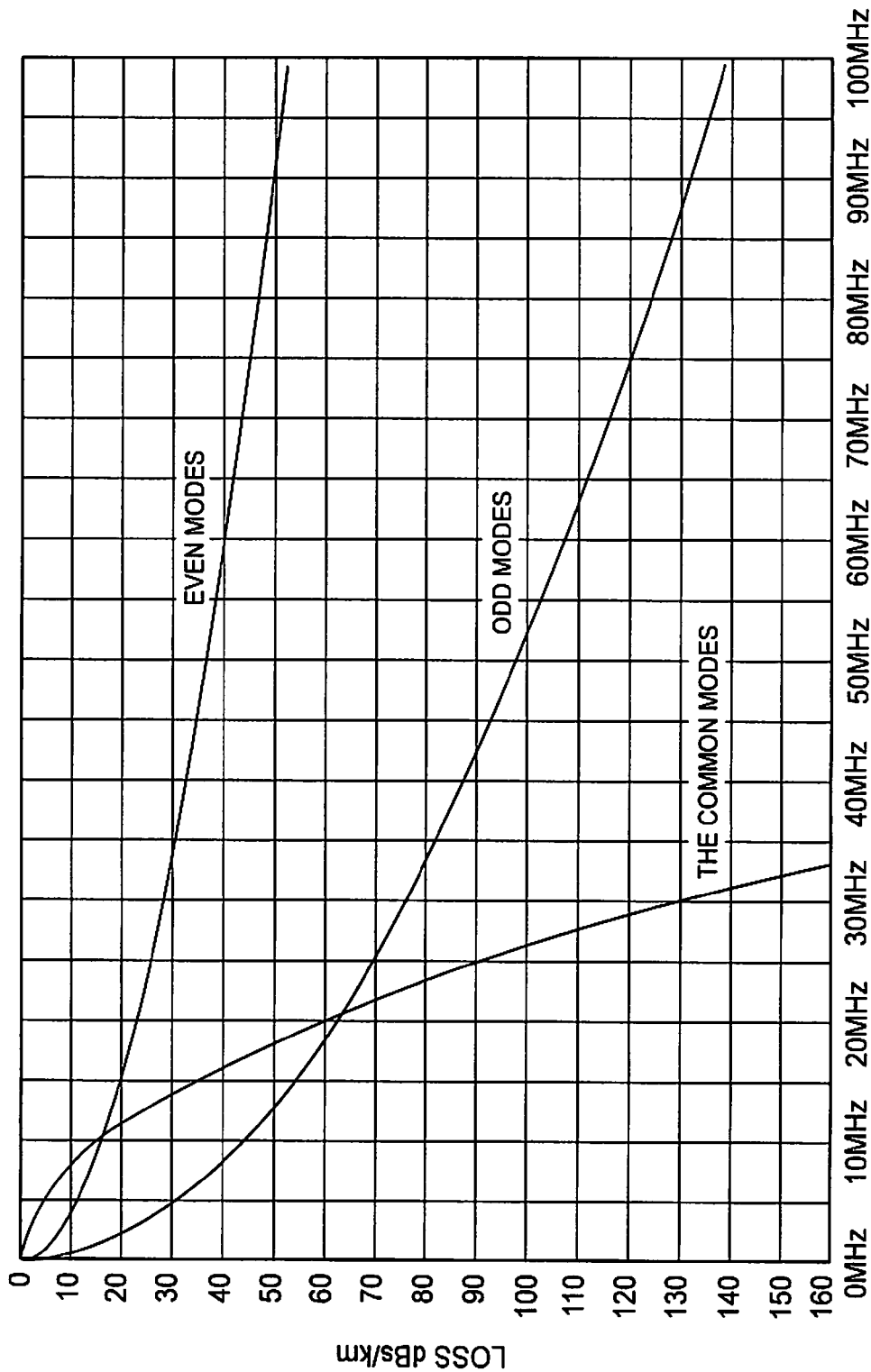
FIG. 12 shows an exemplary plot of the attenuation vs. frequency for Fourier modes.

Just as the above shows that the sixteen Fourier modes exhibit only three different characteristic impedances, it transpires that the sixteen Fourier modes exhibit three different propagation factors, for the common mode, the even modes and the odd modes, respectively. All even modes have the same attenuation characteristics and all the odd modes have the same attenuation characteristics. The loss in dBs per km is plotted in FIG. 12. It may be seen that the loss in the even modes, which in the prior art are unused, is less than half of the loss in the odd modes. This suggests that the even modes could be used for much higher frequencies than the odd modes, which have the same loss as a twisted pair mode. One exemplary way to practice this invention might therefore be to utilize OFDM for the even modes in a different part of the spectrum than the twisted pair modes, thus achieving extra capacity with no impact on the twisted-pair mode usage. The use of the even modes is permitted only when Fourier modes or other suitable Eigenmodes are employed, whereby all twisted pairs are excited in phase with a set of signals for each even mode that are orthogonal to other even mode signal sets. It is not in generally possible to use a single phantom circuit as in FIG. 1 without it coupling to other similar phantom circuits, unless a particular cable construction is employed. However, when practicing the invention, all phantom circuits can be used to construct orthogonal modes without excessive coupling.

The following compares the achievable total data rates for Orthogonal Vector DSL (OVDSL) with conventional DSL. Table 1 shows a link budget for a single twisted pair.

TABLE 1

| | |
|---|---|
| Thermal (kT) | −173 dBm/Hz |
| Excess Noise | 33 dB |
| Total Noise Level | −140 dBm/Hz |
| Transmit Power (2 W) | 33 dBm |
| Bandwidth (0.4-2 MHz) | 62 dBHz |
| Transmit Spectral Density | −29 dBm/Hz |
| Line Loss at 2 MHz & 5 km | −100 dB |
| Line Loss at 1.5 MHz & 5 km | −85 dB |
| Line Loss at 1 MHz & 5 km | −70 dB |

TABLE 1-continued

| | |
|---|---|
| $E_b/N_o$ 140-29-100 | 11 dB @ 2 MHz |
| $E_b/N_o$ 140-29-85 | 26 dB @ 1.5 MHz |
| $E_b/N_o$ 140-29-70 | 41 dB @ 1 MHz |
| Bits/Hz @ 2 MHz | 2 (QPSK) |
| Bits/Hz @ 1.5 MHz | 4 (16 QAM) |
| Bits/Hz @ 1 MHz | 8 (256 QAM) |

From the above we get a rule of thumb: Bits/sec/Hz=$2^{5-2f}$, where f is in MHz, which allows the total data rate to be found by integration from 0.4 MHz to 2 MHz, giving 6.17 Megabits/second at 5 km distance.

There are many devices in the art for optimizing data rates over channels, the quality of which varies with frequency. For example, the technique of "water filling" can be used, where a given transmit power is divided across the available spectrum in an optimum way. Also, higher-order constellations than 256 QAM can be used with error correction coding to give more bits/Hz at a given signal to noise ratio. Discussion of these techniques is however beyond the scope of this disclosure, and because the invention may employ such techniques to advantage just as well, comparisons between the capacity of a twisted pair will be made to the invention using the same link budget method as above.

The first improvement over the performance of a single twisted pair is to employ all five twisted pairs in a multi-pair cable (e.g., an L=5 pair cable) that typically runs to each household. Usually such a cable only runs as far as the curbside distribution box, probably not more than 500 m in a rural area, and would then typically splice into a larger cable along with other subscriber cables at the curbside box. However, it is of interest to compute the data rate for such a cable assuming it were run all the way to the exchange, e.g., with the same 5 km length as calculated above. The use of all five twisted pairs, with mutual-interference cancellation, would simply yield five times the 6.17 Mb/s data rate calculated above, that is 30 Mb/s. Already, this is approaching the goal of being able to deliver multiple HDTV programs to the home. The use of mutual interference cancellation is possible because all five pairs terminate at the same modem and so all signals are available within the modem.

A further improvement is possible by exploiting the strong likelihood that the 33 dB of excess noise over thermal is highly correlated among the ten signals on the five wires. If only 10 dB suppression of this correlated noise were achieved by jointly processing all ten signals, this would permit a 10-15% increase in the maximum frequency useable over the 5 km path, yielding 33 Mb/s data rate. Because the length of the subscriber cable to the curbside junction box would be much shorter than 5 km, it can be seen that the desired capacity over the final subscriber cable would be easily achieved, and with considerably less than the normal 2 W of transmitter power per twisted pair; in fact, 1 mW per wire would suffice. The latter is important because an active OVDSL router/repeater is preferably placed in the curbside distribution box, and its power consumption should be minimized to avoid the need for an electric utility connection.

Figure 13:
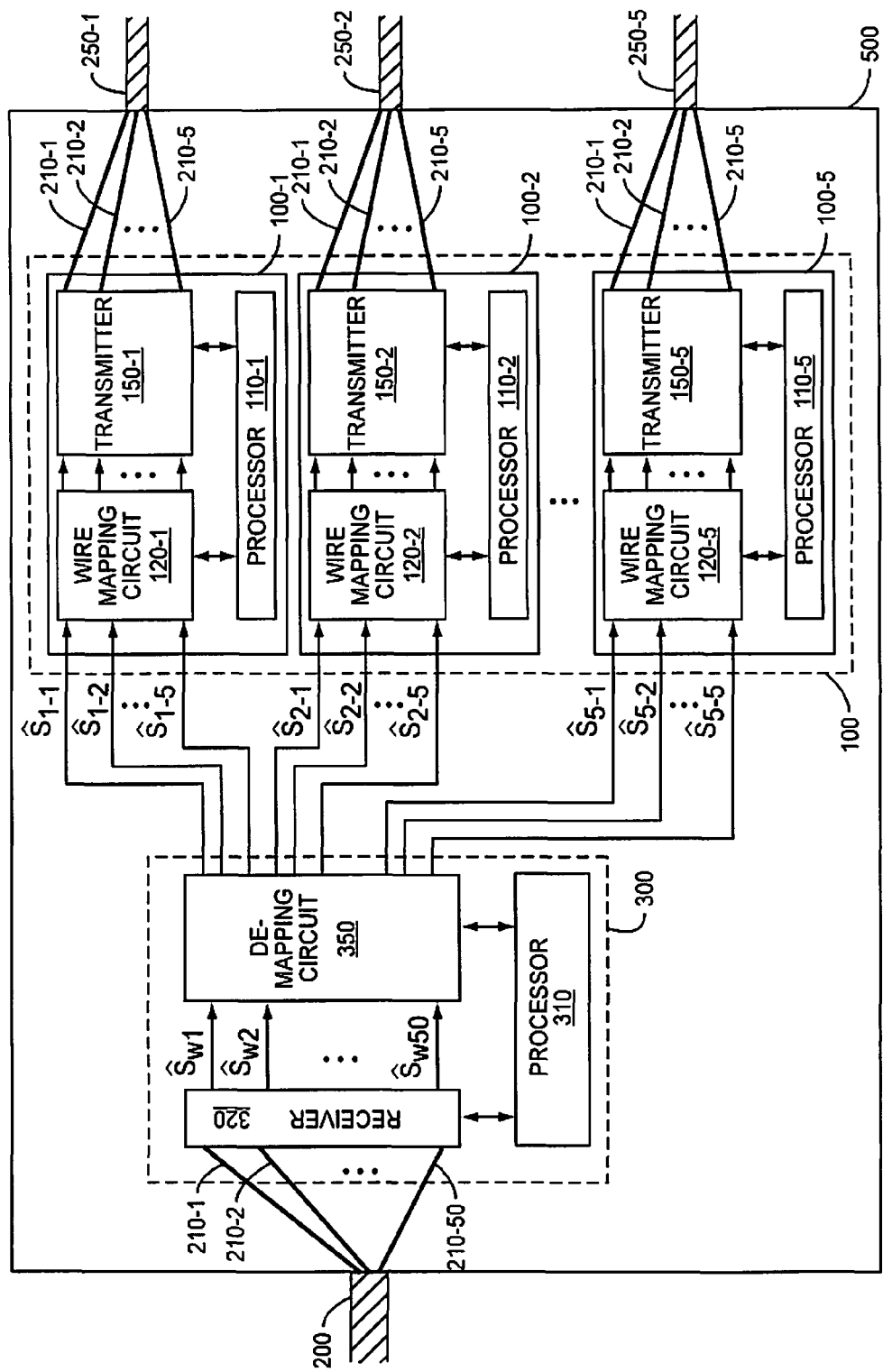
FIG. 13 shows a repeater for retransmitting signals received on a large multi-wire cable to the appropriate destinations using smaller multi-wire cables according to one exemplary embodiment of the present invention.

One possible configuration of such an OVDSL repeater for the curbside distribution box is shown in FIG. 13. FIG. 13 shows an exemplary repeater 500, where one input/output of the repeater 500 connects to an exchange multi-wire cable 200 comprising twenty-five twisted pairs (fifty wires), and another output/input of the repeater connects to five subscriber multi-wire cables 250, each comprising five twisted pairs (ten wires). It will be appreciated, however, that the repeater may be used with any sized exchange and subscriber multi-wire cables 200, 250. It will further be appreciated that a similar configuration may be used for signals transmitted from the subscriber to the exchange.

The exchange cable 200 runs from the exchange, possibly via a much larger distribution frame, to repeater 500. Using active circuitry, the repeater 500 of the present invention splits the received signals between the five subscriber cables 250 running to individual subscribers' homes. The input and output cable configuration shown in FIG. 13 is equivalent to the input and output cable configuration typically used today. Unlike the repeater 500 of the present invention, however, conventional curbside distribution boxes do not contain active circuits or processing.

FIG. 13 also shows the contents of the active repeater 500 according to one exemplary embodiment of the present invention. Repeater 500 comprises a reception system 300 and a transmission system 100. The exchange cable 200 connects to reception system 300, which receives and processes the fifty received signals using the reception process described above. In particular, reception system 300 distinguishes the forty-nine orthogonal "data" modes present on the fifty wires, where the an additional (common) mode is also useable as described above for cable noise cancellation. The forty-nine orthogonal data modes may also be separately distinguished for each subcarrier of an OFDM signal, and each mode and subcarrier thereby has the capability to transport a multi-level complex symbol value selected from the symbol alphabet of a modulation constellation such as 16 QAM, 256 QAM, etc.

For each OFDM carrier, ten de-mapped signals of the fifty, including a null signal, are selected to be carried by the ten orthogonal modes of one of the subscriber cables 250. The ten selected de-mapped signals, which include a null signal, are input to a transmission subsystem 120 connected to the corresponding subscriber cable 250. Each transmission subsystem 120 processes the input signals using the transmission process described above to distinguish the ten orthogonal modes for the corresponding subscriber cable 250, also separately for each OFDM carrier if that was the method used on the exchange cable. Thus, 10 de-mapped symbols per OFDM carrier out of the fifty de-mapped symbols per OFDM carrier are transferred between the exchange cable 200 and each subscriber cable 250. The coding or decoding of symbol values in each of the reception and transmission systems 300, 100 may optionally include any or all of:

modulation/demodulation, in which symbol values are either constrained to be from a finite alphabet or left as analog values (e.g., hard symbol decisions versus soft symbol decisions);

error correction/detection coding or decoding;

adaptive modulation constellation selection and bit allocation per OFDM carrier, e.g., changing the mapping of bits to symbols between system 300 and system 100;

fixed mapping from system 300 to subsystems 120 of system 100 versus packet routing;

cable noise cancellation; and equalization across cable modes to cancel interference from one nominally orthogonal mode to another, which may be done per subcarrier.

If the simplest options are selected among the above, the function performed by repeater 500 might only be to transfer analog values between mode/subcarrier coordinates of the exchange cable 200 to the mode/subcarrier coordinates of the subscriber cables 250. In some locations, an even simpler repeater 500 might only contain amplifiers for buffering the DSL signals between the subscriber cable 250 and exchange cable 200 and terminating each cable optimally.

Continuing to implement more features of the invention, it can be seen that the even-modes suffer less than half the attenuation per kilometer than the odd-modes. This allows the even-modes to be used in a different part of the spectrum, if so desired, than the odd modes. With the assumed cable parameters, the even modes suffer the same propagation loss at 15 MHz that the odd modes suffer at 2 MHz. This allows the even modes to achieve approximately 7.5 times the data rate of the odd modes with the same transmit spectral density, that is, around 45 Mb/s per mode. In a five-pair cable, five odd modes and four even modes are useable. Thus, the four even modes should support 180 Mb/s over 5 km in addition to the five odd modes supporting 30 MB/s, giving 210 MB/s total. This is sufficient for providing about sixteen HDTV channels, so that a five-pair cable is all that is needed from the exchange to the curbside distribution box for approximately five to eight homes. Typically there are a great many more than five pairs in the cable from a neighborhood distribution box to the exchange—more like twenty-five to fifty pairs, which would therefore support 1-2 Gb/s total with 5 km range, supporting as many as one hundred homes with multiple HDTV programs each.

Note that, in multi-wire DSL systems as described herein, a significant trade-off between the number of wires in the cable and the power required to drive the cable can be made. For the same data rate, using twice the number of wires requires only half the bandwidth. Because the line attenuation increases rapidly with frequency, far less sender power may be required as a result. Further, since wire line companies are currently concerned about their power consumption in the DSL senders, there is therefore a strong incentive to use all available wires in a cable to transmit a given data rate. The use of the repeaters 500 described herein, even repeaters 500 having simple amplifiers, can be considered for longer cable runs, as modern technology has rendered these much smaller and cheaper than used to be the case.

Figure 14:
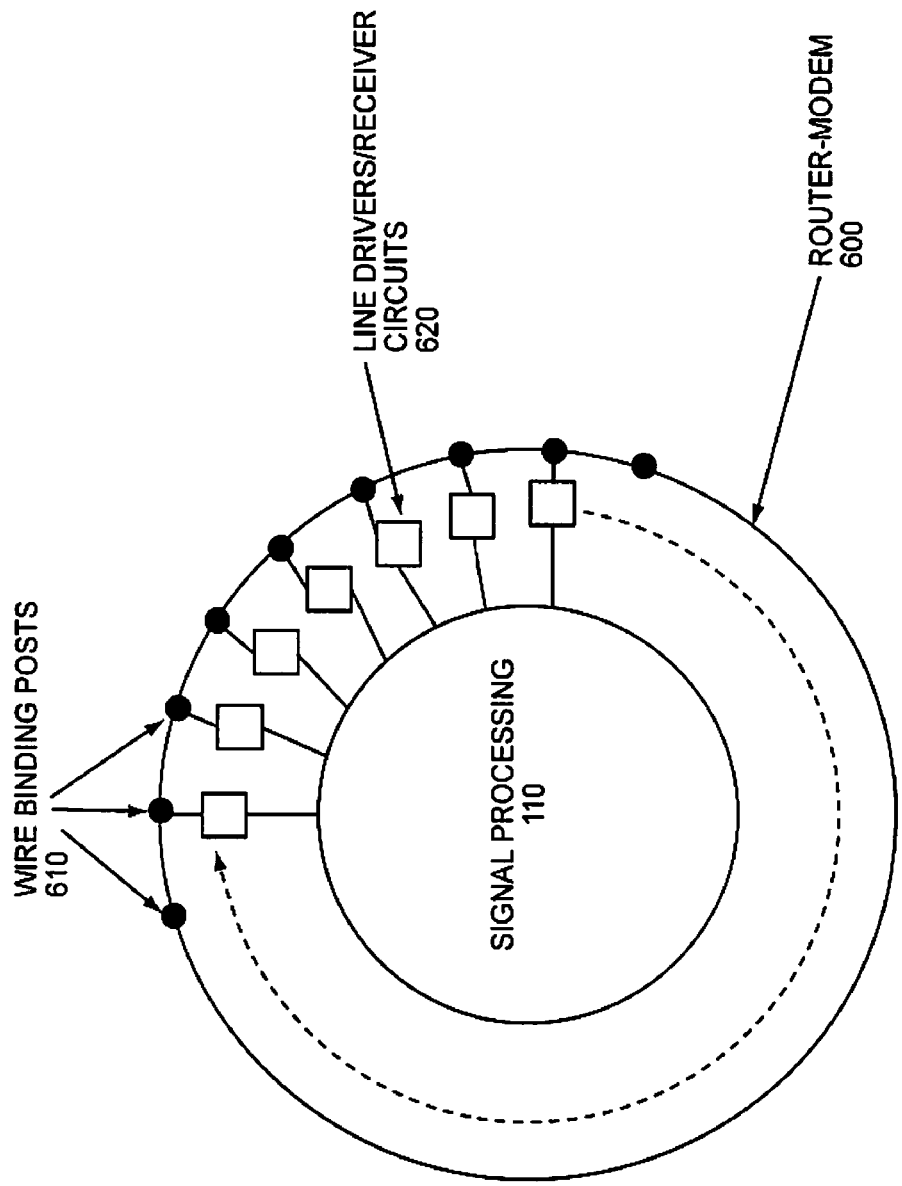
FIG. 14 shows an exemplary router unit with uncommitted connections.

FIG. 14 shows the basic concept of a cable-router-modem 600 used as part of the repeater 500 based on the above principles. To avoid the need for many different models, a design is envisaged that has a certain number of wire connections 610 available that are not pre-committed to any particular cable size or direction of transmission. The larger exchange cable 200 would be connected to a first number of the wire binding posts 610, while smaller subscriber cables 250 would be connected to other wire binding posts 610. For example, a fifty-pair exchange cable 200 would occupy one hundred binding posts 610, and ten, five-pair subscriber cables 250 would occupy another one hundred binding posts 610. A suitable standard router-modem size may therefore have about two hundred binding posts 610, to be allocated in any desired way. The only constraint placed on the wireman is that cable pairs should go to designated binding post pairs, which might for example be color-coded black and red alternately. This assists in achieving the inventive allocation of Fourier-coded signals to wires according to the invention, and simplifies terminating wires according to FIG. 10. It also facilitates simultaneously using the same lines independently for Plain Old Telephones (POTS).

Each wire binding post 610 is internally connected to a single-ended line driver-receiver circuit 620. The line driver-receivers 620 may be constructed in pairs, and associated with a pair of red and black color coded binding posts 610. Integrated circuit technology allows several pairs of such line driver-receiver circuits 620 to be fabricated on the same silicon chip to reduce board area.

The line driver-receiver circuits 620 may include digital-to-analog and analog-to-digital converters to complete the interface to the reception and transmission systems 300, 100, as described herein. Other components external to the above-described transmission and reception systems 100, 300, or included in the corresponding transmitter 150 and/or receiver 320, may include filtering to separate telephone-band audio, DC and signaling from the OVDSL signals, and may extract power from the 50 volts available on the exchange lines to power the router-modem. Because only a mA or so may be extracted per twisted pair to the exchange, it is important for router-modems 600 that are remote from utility power access to be of low power consumption. This is facilitated by the assumption that the traffic is principally in the direction exchange to subscriber, and that the length of the tail circuit to the subscriber is less than 1 km. Very little transmit power is thus required in the direction of the subscriber, and little transmit power is required in the direction of the exchange because it is assumed that the communications service does not need high bit rate from a subscriber towards the exchange except for very occasional Internet uploads.

Figure 15:
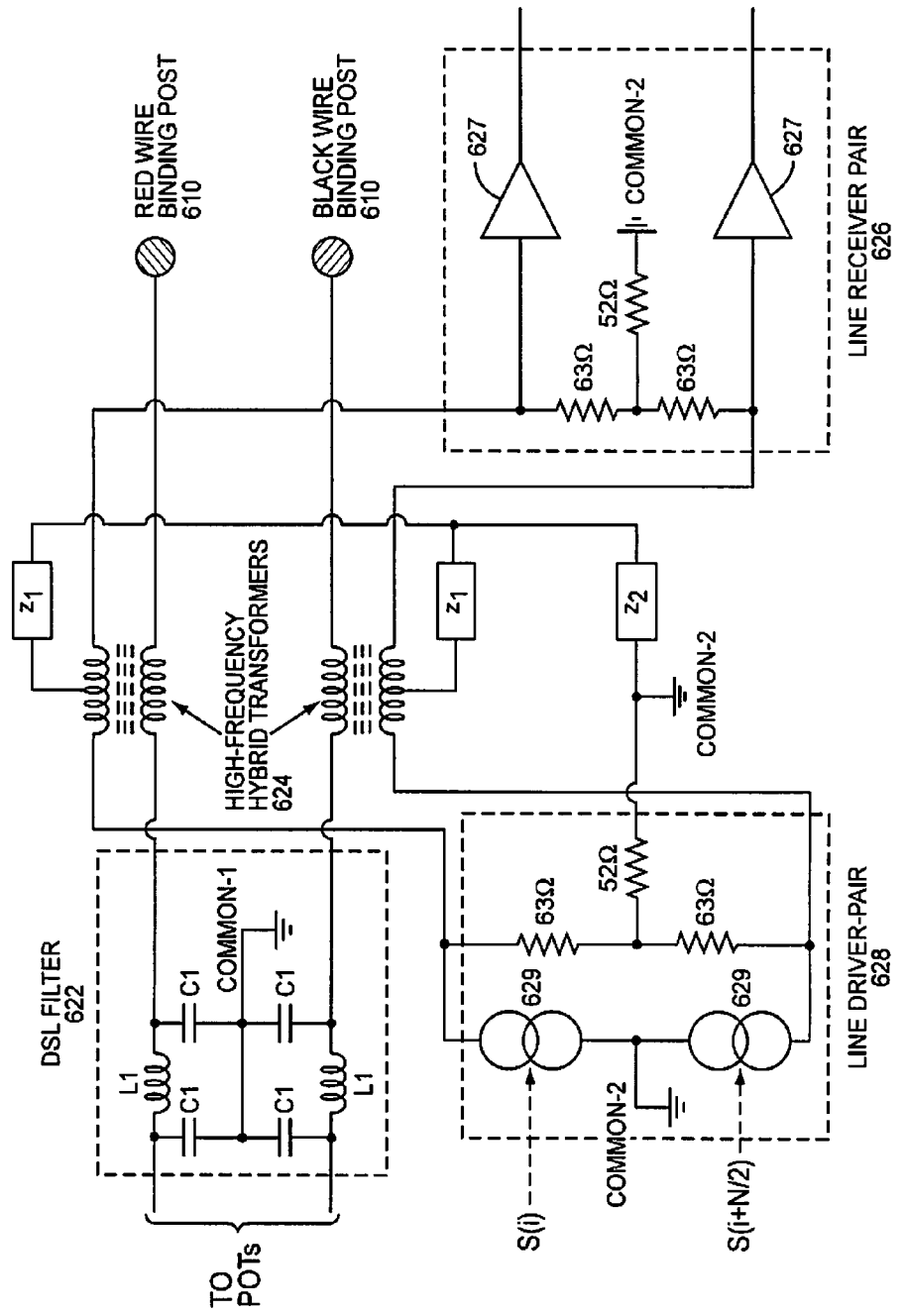
FIG. 15 shows an exemplary line interfacing circuit.

FIG. 15 shows more details of a line driver-receiver 620 comprising a line-interface circuit 622, transformers 624, line-receiver pair 626, and line-driver pair 628. It is assumed that the invention would need to be installed without disturbing existing POTs services. Therefore, the line interface circuit 622 comprises a DSL filter comprising a plurality of inductors and capacitors configured to separate out POT signals from the signals of the invention. If the POTs subscriber also wishes to continue to use an existing DSL modem, then the router-modem can include the capability to generate a regular DSL signal and to reinsert it into the subscriber line. This is done by connecting the POTs line from the subscriber to a pair of black and red binding posts, and connecting two pairs of POTs terminals on the router-modem back-to-back.

Since it is common to use a matching transformer to match a DSL line driver 622 to the line for transmitter efficiency reasons, the transformer 624 may comprise a hybrid transformer for the OVDSL signals, obviating the need to consider more complex electronic hybrids. The purpose of the hybrid transformers 624 is to separate the transmit signals from the receiver signals so that the transmit signals do not overload or add noise to the receive signals. Additional filters (not shown) are also commonly used to separate the transmit and receive signal by assigning them different spectrum. However, this is only one way of accommodating bidirectional signal flow when using the invention. Another way could be to allow transmit and receive directions to use different Fourier modes or to transmit and receive OFDM symbols at different times.

Hybrid transformers 624 achieve their isolation of transmitter from receiver by effectively forming a balanced bridge circuit wherein the components labeled $z_1$, $z_1$, $z_2$ achieve balance by matching the impedance of the line, suitably scaled if necessary by the transformer ratio. When the primary (line side) to secondary (end-to-end) turns ratio is $1:\sqrt{2}$, the line driver source impedance and the line receiver terminating impedance should equal the line impedance, and the hybrid balancing components $z_1$, $z_1$, $z_2$ should match ½ the line impedance. As explained with the aid of FIG. 7, the line impedance is different for Fourier modes that drive the two wires 210 of each twisted pair 220 in anti-phase (odd modes) as compared with those that drive the two wires in phase (even modes). Consequently, the dual-impedance termination of FIG. 10 is used along with current sources 629 to create a dual-driver impedance and with line receivers 626 to create a dual terminating impedance. Moreover, the hybrid balancing components $z_1$, $z_1$, $z_2$ similarly create a dual-impedance line match. The components $z_1$, $z_1$, $z_2$ can be more than simple resistors, as is known in the current art, in order to obtain a high degree of balance across a wide frequency band. Typically, the line characteristic impedance would be determined either by simulation, measurement, or both, at a range of frequencies, and then the matching impedance would be synthesized using a combination of resistors and capacitors. To facilitate a router-modem of a common type being suitable for a large number of different cable sizes and types, it is envisaged that the components $z_1$, $z_1$, $z_2$ and the resistors shown nominally as 63Ω and 52Ω would be fabricated in a plurality of instances on a plug-in module using surface mounted components or thick-film technology, which would place further constraints on the wireman to ensure that a given cable was connected to those binding posts associated with the correct plug-in impedance-matching module.

Digital-to-Analog converters (not shown) convert signals from the digital domain to drive signals for line driver pair 628, and analog-to-digital converter circuits convert the analog voltage signals from line receiver amplifiers 627 to the digital domain. Once in the digital domain, the following processes can be implemented digitally under software control by one or more digital processors.

1. Grouping M−1 symbols for transmission using M−1 of the M Fourier modes of an M-wire cable (M/2 pairs), and combining them using the Fourier codes, pre-equalized Fourier Codes, or other Eigenvectors to obtain wire-mapped signals for any given OFDM subcarrier frequency.
2. Collecting wire-mapped signals for the same wire and different OFDM subcarrier frequencies and performing an Inverse DFT to obtain transmission waveforms for digital-to-analog conversion. NOTE: It is possible to reverse the order of steps 1 and 2, as discussed further below. The order recited, however, has the advantage that the Fourier Codes or other Eigenvectors can be pre-equalized or determined separately for each OFDM subcarrier, thus anticipating line characteristics that vary with frequency, due to splicing, for example.
3. Determining an optimum amount of each transmit signal to subtract digitally from each digitized received signal in order to remove transmit-receive interference not completely balanced out by the hybrid transformers.
4. Performing a DFT on the signal from each wire to obtain per-OFDM subcarrier signal values.
5. Determining an additional amount of transmit signal per OFDM subcarrier to subtract from each corresponding received OFDM subcarrier signal value to further remove transmit-receive interference on a per subcarrier basis, in the case that transmission and reception takes place using the same OFDM subcarriers at the same time.
6. Selecting corresponding OFDM subcarrier values from each of the M wire channels and performing an M-point IDFT to reconstruct the M−1 symbols selected in step 1, plus a null symbol that is indicative of an unwanted common mode signal.
7. Determining any noise correlation between the M signals output by the DFT in step 6 and using the correlation to reconstruct the M−1 symbols in a way that reduces the influence of correlated noise.
8. Performing an initialization protocol between the router-modem 600 and any remote device to establish the number of fault-free wires and their connections to binding posts. This can be done by transmitting test signals on one twisted pair at a time to verify the presence of odd modes first, and then verifying the presence of even modes, and finally all modes at once. During initialization, it can be determined whether unmodified Fourier codes can be used, or whether they need pre- or post-equalizing using an equalizing matrix to generate codes more accurately matched to the true Eigenmodes of the actual cable.

9. Performing error-correction coding and decoding, separation of data into packets, and routing the packets after re-encoding for onward transmission to the intended destination according to the decoded IP address.

10. Detecting the sudden appearance of a fault condition and repeating step 8 to automatically heal the fault.

11. Reporting status, traffic loading etc to the exchange by inserting packets addressed to the exchange processor using any spare modes, symbols or capacity as an "order wire".

It was mentioned above that power for the router-modem 600 is preferably derived from the 50-volt exchange battery rather than requiring a utility connection. However, an additional possibility is that the subscriber OVDSL modems be expected to provide a certain amount of the required power. For example, a 5-pair subscriber cable 250 could be expected to provide 1 mA per pair at 50 V, a total of 250 mW. This would be prevented from over-volting the exchange 50 V by use of a voltage limit on the source as well as a high series resistor of perhaps 50 kΩ and Zener diode over-volt protection. The 0.5 W of power consumption on the subscriber's utility bill is a negligible cost for the subscriber, but together, the subscribers thereby supply a considerable fraction, or more, of the router-modem power required to serve them. If the subscriber terminal was switched off, it would neither power nor require the router-modem to consume power, thus ensuring a match between supply and demand.

Figure 16A:
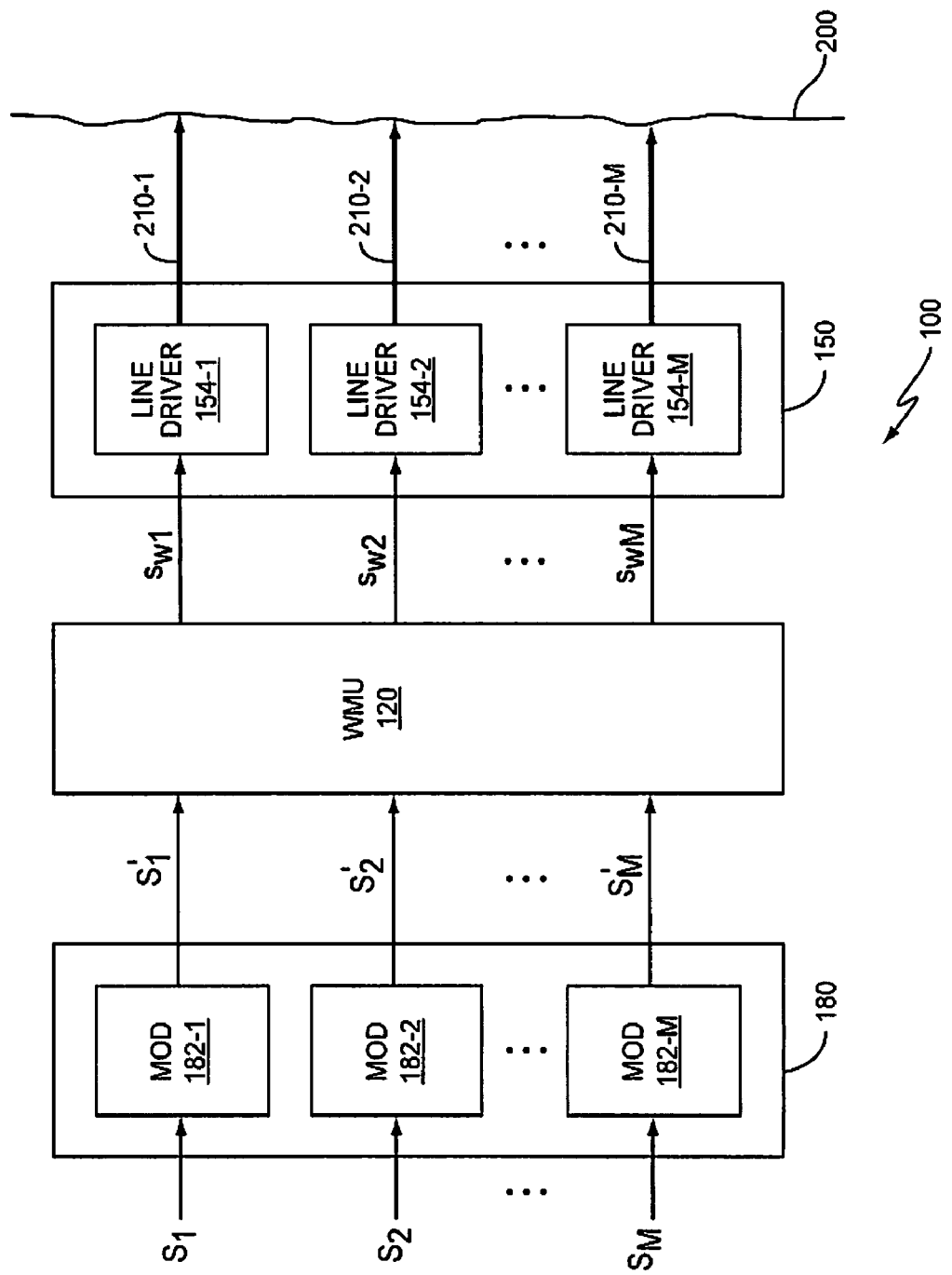
FIGS. 16A and 16B show additional details of the transmission and reception systems, respectively, of FIG. 3 according to another exemplary embodiment.
Figure 16B:
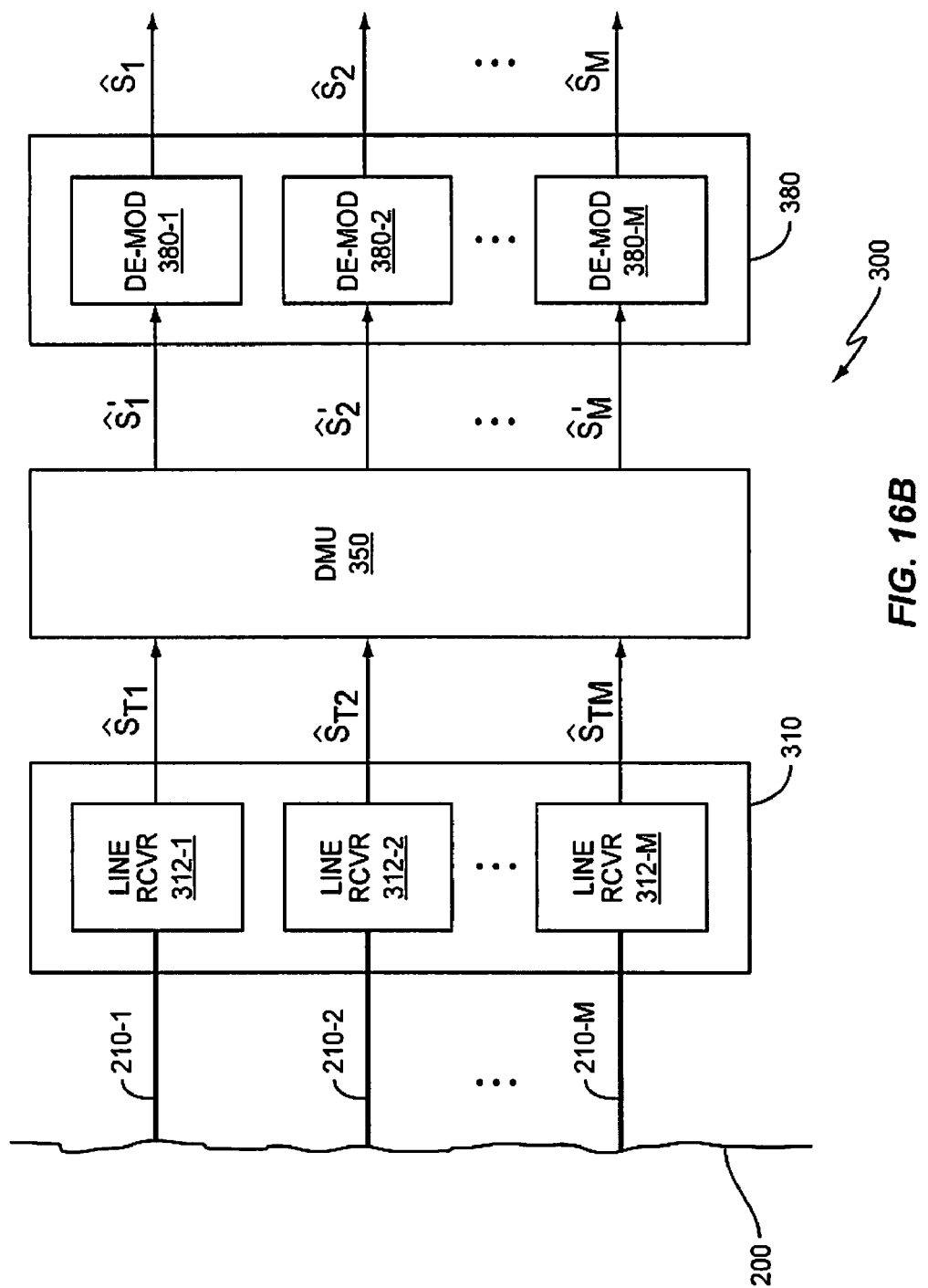

The above transmission systems 100 generally modulate wire-mapped signals, while the corresponding reception systems 200 generally de-modulate received signals to generate wire-mapped signals. It will be appreciated, however, that the present invention is not limited to this embodiment. FIGS. 16A and 16B show an alternate embodiment that inverts the order of the wire-mapping and modulation in the transmission system 100, and similarly inverts the order of the demodulation and de-mapping in the reception system 300. In this embodiment, the transmission system 100 comprises a modulation circuit 180, followed by the wire-mapping circuit 120 and transmitter 150. The modulation circuit 180 comprises a plurality of modulators 180-$m$, one for each input signal. A first modulator 180-1 modulates the symbols of the first input signal $S_1$ to generate a modulated signal stream $S_1'$ for the first wire 210-1 of the multi-wire cable 200. Similarly, each of the remaining modulators 180-$m$ modulate the symbols of the corresponding input signal to generate a modulated signal stream for the corresponding wire 210 of the multi-wire cable 200.

Similarly, the reception system 300 shown in FIG. 16B comprises a receiver 310, a de-mapping circuit 350, and a demodulation circuit 380. Receiver 310 comprises a line receiver 312 for each of the wires 210 in the multi-wire cable 200, where each line receiver 312 processes the received signal to generate a wire-mapped signal for the corresponding wire. The de-mapping circuit 350 applies the same de-mapping matrix to each wire-mapped signal to estimate a modulated signal stream for the corresponding wire. Demodulation circuit 380 comprises a plurality of demodulators 382, one for each wire, where each demodulator 382 demodulates the corresponding modulated signal stream estimate to generate symbol estimates for the corresponding signal.

Because the modulated signal streams each comprise a combination of all of the corresponding subcarrier-specific components, the wire-mapping circuit 120 of this embodiment applies the same wire-mapping code matrix to each of the input modulated signal streams to generate the wire-mapped signal for each wire 210. Subsequently, each line driver 154 in transmitter 150 generates a transmission signal from the corresponding wire-mapped signal, and drives the corresponding wire 210 with the generated transmission signal.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A transmission system for processing three or more input signals for transmission along a multi-wire cable comprising three or more wires, wherein the multi-wire cable comprises a wire for each input signal, and wherein one of the input signals comprises a null signal, the transmission system comprising:

a wire-mapping circuit configured to apply a wire-mapping code matrix to the input signals to generate a wire-mapped signal for each wire such that each wire-mapped signal comprises a different combination of all of the input signals, wherein the wire-mapping circuit comprises a plurality of wire-mapping units, and wherein each wire-mapping unit is configured to apply a unit-specific wire-mapping code matrix to symbols from each of the input signals to generate a component of the wire-mapped signal for each wire, each of the wire-mapped signal components generated by one wire-mapping unit corresponding to one subcarrier or subcarrier group and comprising a different combination of all of the corresponding input symbols;

a transmitter configured to generate a transmission signal for each wire based on the corresponding wire-mapped signal, and to drive each wire with the corresponding transmission signal, wherein the transmitter comprises for each wire;

a modulator configured to modulate the wire-mapped signal generated for the corresponding wire to generate the transmission signal for the corresponding wire, wherein each modulator comprises a multi-carrier modulator configured to generate a multi-carrier transmission signal for the corresponding wire, said multi-carrier transmission signals each comprising a plurality of subcarriers or subcarrier groups, wherein each multi-carrier modulator comprises an OFDM modulator, and wherein each OFDM modulator is configured to generate an OFDM transmission signal from the wire-mapped signal components corresponding to the respective wire; and a line driver configured to drive the corresponding wire with the corresponding transmission signal;

wherein the input signals comprise M input signals, one for each of M wires, where each of the M input signals includes N OFDM subcarriers;

wherein the plurality of wire-mapping units comprise N wire-mapping units, each configured to implement an M-point discrete Fourier transform using the corresponding unit-specific wire-mapping code matrix; and wherein the OFDM modulators comprise M OFDM modulators, each configured to generate an OFDM transmission signal from the wire-mapped signal components corresponding to the respective wire using an N-point inverse discrete Fourier transform.

2. A transmission system for processing three or more input signals for transmission along a multi-wire cable comprising three or more wires, wherein the multi-wire cable comprises a wire for each input signal, and wherein one of the input signals comprises a null signal, the transmission system comprising:

a wire-mapping circuit configured to apply a wire-mapping code matrix to the input signals to generate a wire-mapped signal for each wire such that each wire-mapped signal comprises a different combination of all of the input signals;

a transmitter configured to generate a transmission signal for each wire based on the corresponding wire-mapped signal, and to drive each wire with the corresponding transmission signal;

a setup processor configured to assign at least one pair of transmission signals to a twisted pair of wires in the multi-wire cable such that for each assigned pair of transmission signals, the transmission signal assigned to one wire of the twisted pair of wires is derived from a wire-mapped signal that contains input signals either nominally in phase or nominally 180° out of phase relative to the same input signals contained in the wire-mapped signal used to derive the transmission signal on the other wire in the same twisted pair of wires, wherein the setup processor is further configured to:

characterize the propagation characteristics of test transmission signals transmitted along twisted pairs of wires in the multi-wire cable;

evaluate the propagation characteristics to determine signal-to-wire assignments that reduce cross-talk caused by the multi-wire cable; and assign at least one pair of transmission signals to a twisted pair of wires in the multi-wire cable based on the signal-to-wire assignments, and further wherein the setup processor determines new signal-to-wire assignments responsive to a failure in one or more of the wires in the multi-wire cable, and reassigns at least one transmission signal to a new wire in the multi-wire cable based on the new signal-to-wire assignment.

3. A method of processing three or more input signals for transmission along a multi-wire cable comprising three or more wires, wherein the multi-wire cable comprises a wire for each input signal, and wherein one of the input signals comprises a null signal, the method comprising:

applying a wire-mapping code matrix to the input signals to generate a wire-mapped signal for each wire, wherein each wire-mapped signal comprises a different combination of all of the input signals; and generating a transmission signal for the corresponding wire based on the corresponding wire-mapped signal, wherein each transmission signal comprises a multi-carrier transmission signal comprising a plurality of subcarriers or subcarrier groups, wherein the generating the transmission signal for each wire comprises separately applying OFDM modulation to each of the wire-mapped signal components associated with the corresponding wire using a wire-specific OFDM modulator to generate an OFDM transmission signal for the corresponding wire; and wherein applying a wire-mapping code matrix to the input signals comprises applying each of a plurality of wire-mapping code matrices, one for each subcarrier or subcarrier group, to symbols from each of the input signals to generate a component of the wire-mapped signal for each wire, each of the wire-mapped signal components derived from one wire-mapping code matrix corresponding to one subcarrier or subcarrier group;

wherein the input signals comprise M input signals, one for each of M wires, where each of the M input signals includes N OFDM subcarriers;

wherein applying the wire-mapping code matrix to the input signals comprises using N wire-mapping code matrices, one for each of the N OFDM subcarriers, to implement an M-point discrete Fourier transform for each of the N OFDM subcarriers; and wherein generating the transmission signal for each wire comprises using M OFDM modulators, each configured to apply an N-point inverse discrete Fourier transform to generate an OFDM transmission signal from the wire-mapped signal components associated with the corresponding wire.

4. A method of processing three or more input signals for transmission along a multi-wire cable comprising three or more wires, wherein the multi-wire cable comprises a wire for each input signal, and wherein one of the input signals comprises a null signal, the method comprising:

applying a wire-mapping code matrix to the input signals to generate a wire-mapped signal for each wire, wherein each wire-mapped signal comprises a different combination of all of the input signals; and generating a transmission signal for the corresponding wire based on the corresponding wire-mapped signal;

assigning at least one pair of transmission signals to a twisted pair of wires in the multi-wire cable such that for each assigned pair of transmission signals, the transmission signal assigned to one wire of the twisted pair of wires is derived from a wire-mapped signal that contains input signals either nominally in phase or nominally 180° out of phase relative to the same input signals contained in the wire-mapped signal used to derive the transmission signal assigned to the other wire in the same twisted pair of wires;

characterizing the propagation characteristics of test transmission signals transmitted along twisted pairs of wires in the multi-wire cable;

evaluating the propagation characteristics to determining a signal-to-wire assignment that reduces cross-talk caused by the multi-wire cable;

assigning at least one pair of transmission signals to a twisted pair of wires in the multi-wire cable based on the signal-to-wire assignment;

determining a new signal-to-wire assignment responsive to a failure in one or more of the wires in the multi-wire cable; and reassigning at least one transmission signal to a new wire in the multi-wire cable based on the new signal-to-wire assignment.

5. A reception system for processing three or more signals received via a multi-wire cable comprising three or more wires, wherein each wire carries a different signal, the reception system comprising:

a receiver configured to process the received signals to estimate a wire-mapped signal associated with each wire, wherein the receiver comprises a demodulator for each wire, wherein each demodulator is configured to demodulate the signal received via the corresponding wire to estimate the wire-mapped signal associated with the corresponding wire and further wherein each demodulator comprises a multi-carrier demodulator configured to demodulate the multi-carrier signal received via the corresponding wire to estimate a wire-mapped signal comprising a plurality of wire-mapped signal components corresponding to different subcarriers or subcarrier groups;

a de-mapping circuit configured to apply a de-mapping code matrix to the wire-mapped signals to estimate de-mapped signal streams such that each de-mapped signal stream comprises a different combination of all of the wire-mapped signals, wherein each de-mapped signal stream corresponds to a different wire, and wherein one of the de-mapped signal streams corresponds to a null signal stream and further wherein the de-mapping circuit comprises a plurality of de-mapping units, one for each of the subcarriers or subcarrier groups, wherein each de-mapping unit is configured to apply a unit-specific de-mapping code matrix to the wire-mapped signal components associated with the corresponding subcarrier or subcarrier group to estimate a symbol associated with the corresponding subcarrier or subcarrier group for each de-mapped signal stream, and wherein each symbol comprises a different combination of all of the corresponding wire-mapped signal components;

wherein each received signal comprises a multi-carrier signal comprising a plurality of subcarriers or subcarrier groups and further wherein each received signal comprises an OFDM signal comprising a plurality of OFDM subcarriers, and wherein each multi-carrier demodulator comprises an OFDM demodulator configured to demodulate the corresponding received OFDM signal to estimate the wire-mapped signal component for the corresponding wire-mapped signal for each OFDM subcarrier, wherein the received OFDM signals comprise M received OFDM signals, one for each of M wires, where each of the M received OFDM signals comprise N OFDM subcarriers;

wherein the OFDM demodulators comprise M OFDM demodulators, one for each of the M wires, wherein each OFDM demodulator is configured to demodulate the corresponding received OFDM signal using an N-point discrete Fourier transform; and wherein the plurality of de-mapping units comprise N de-mapping units, each configured to implement an M-point inverse discrete Fourier transform using the corresponding unit-specific de-mapping code matrix.

6. A method for processing three or more signals received via a multi-wire cable comprising three or more wires, wherein each wire carries a different signal, the method comprising:

processing the received signals to estimate a wire-mapped signal associated with each wire, wherein each received signal comprises a multi-carrier signal comprising a plurality of subcarriers or subcarrier groups, and wherein each wire-mapped signal comprises a plurality of wire-mapped signal components corresponding to different subcarriers or subcarrier groups, wherein processing the received signal comprises separately demodulating each of the received signals using a wire-specific demodulator to estimate the wire-mapped signal associated with the corresponding wire and wherein each received signal comprises an OFDM signal comprising a plurality of OFDM subcarriers, and wherein processing the received signals comprises separately applying OFDM demodulation to each received OFDM signal using a wire-specific OFDM demodulator to estimate the wire-mapped signal component for the corresponding wire-mapped signal for each OFDM subcarrier, further wherein the received OFDM signals comprise M received OFDM signals, one for each of M wires, where each of the M received OFDM signals comprise N OFDM subcarriers;

wherein separately applying OFDM demodulation comprises separately applying one of M OFDM demodulators to the corresponding received OFDM signal to demodulate the corresponding received OFDM signal using an N-point discrete Fourier transform; and wherein applying the de-mapping code matrices to the wire-mapped signal components from each of the wire-mapped signals comprises separately applying one of N de-mapping units to the corresponding wire-mapped components of the wire-mapped signals to implement an M-point inverse discrete Fourier transform using the corresponding de-mapping code matrix;

applying a de-mapping code matrix to the wire-mapped signals to estimate de-mapped signal streams such that each de-mapped signal stream comprises a different combination of all of the wire-mapped signals, wherein each de-mapped signal stream corresponds to a different wire, and wherein one of the de-mapped signal streams corresponds to a null signal stream, wherein applying a de-mapping code matrix to the wire-mapped signals comprises applying each of a plurality of de-mapping code matrices, one for each subcarrier or subcarrier group, to the wire-mapped signal components from each of the wire-mapped signals associated with the corresponding subcarrier or subcarrier group to estimate one or more symbols for each de-mapped signal stream, each of the de-mapped signal stream symbols derived from one de-mapping code matrix corresponding to one subcarrier or subcarrier group.

7. A method for processing three or more signals received via a multi-wire cable comprising three or more wires, wherein each wire carries a different signal, the method comprising:

processing the received signals to estimate a wire-mapped signal associated with each wire;

applying a de-mapping code matrix to the wire-mapped signals to estimate de-mapped signal streams such that each de-mapped signal stream comprises a different combination of all of the wire-mapped signals, wherein each de-mapped signal stream corresponds to a different wire, and wherein one of the de-mapped signal streams corresponds to a null signal stream;

receiving a signal-to-wire assignment from a remote transmitter, said signal-to-wire assignment designed to reduce cross-talk caused by the multi-wire cable;

assigning at least one twisted pair of wires in the multi-wire cable to a pair of de-mapping code matrices based on the received signal-to-wire assignment;

receiving a new signal-to-wire assignment upon failure of one or more of the wires in the multi-wire cable; and reassigning at least one wire in the multi-wire cable to a de-mapping unit based on the new signal-to-wire assignment.

8. A method of processing three or more signals received via at least one first multi-wire cable, each comprising three or more first wires, for retransmission via at least one second multi-wire cable, each comprising three or more second wires, wherein each first wire carries a different signal, wherein each second wire corresponds to a different retransmission signal, and wherein at least one of the received signals corresponds to a null signal, said method comprising:

processing the signals received via separate first multi-wire cables in separate reception systems, wherein each reception system connects to a different first multi-wire cable, and wherein each reception system processes the corresponding received signals by processing the signals received via the corresponding first multi-wire cable to estimate a first wire-mapped signal associated with each first wire in the corresponding first multi-wire cable; and applying a de-mapping code matrix to the first wire-mapped signals estimated for the corresponding first multi-wire cable to estimate de-mapped signal streams such that each de-mapped signal stream comprises a different combination of all of the first wire-mapped signals of the corresponding first multi-wire cable, wherein each de-mapped signal stream corresponds to a different first wire in the corresponding first multi-wire cable, and wherein at least one of the de-mapped signal streams corresponds to a null signal stream;

processing the de-mapped signal streams intended for separate second multi-wire cables in separate transmission systems, wherein each transmission system connects to a different second multi-wire cable, and wherein each transmission system processes the corresponding de-mapped signal streams by applying a wire-mapping code matrix to input signal streams associated with the corresponding second multi-wire cable, said input signal streams comprising one null signal stream and the corresponding de-mapped signal streams, to generate a different second wire-mapped signal for different second wires of the corresponding second multi-wire cables such that each second wire-mapped signal comprises a different combination of all of the corresponding input signal streams; and generating retransmission signals for the corresponding second wires of the corresponding second multi-wire cable based on the corresponding second wire-mapped signals, wherein the number of first wires in the first multi-wire cable correspond to the total number of second wires in the second multi-wire cables, wherein the reception system connects to the first multi-wire cable, and wherein different transmission systems connect to different second multi-wire cables.

9. A method of processing three or more signals received via at least one first multi-wire cable, each comprising three or more first wires, for retransmission via at least one second multi-wire cable, each comprising three or more second wires, wherein each first wire carries a different signal, wherein each second wire corresponds to a different retransmission signal, and wherein at least one of the received signals corresponds to a null signal, said method comprising:

processing the signals received via separate first multi-wire cables in separate reception systems, wherein each reception system connects to a different first multi-wire cable, and wherein each reception system processes the corresponding received signals by processing the signals received via the corresponding first multi-wire cable to estimate a first wire-mapped signal associated with each first wire in the corresponding first multi-wire cable;

applying a de-mapping code matrix to the first wire-mapped signals estimated for the corresponding first multi-wire cable to estimate de-mapped signal streams such that each de-mapped signal stream comprises a different combination of all of the first wire-mapped signals of the corresponding first multi-wire cable, wherein each de-mapped signal stream corresponds to a different first wire in the corresponding first multi-wire cable, and wherein at least one of the de-mapped signal streams corresponds to a null signal stream; and processing the de-mapped signal streams intended for separate second multi-wire cables in separate transmission systems, wherein each transmission system connects to a different second multi-wire cable, and wherein each transmission system processes the corresponding de-mapped signal streams by applying a wire-mapping code matrix to input signal streams associated with the corresponding second multi-wire cable, said input signal streams comprising one null signal stream and the corresponding de-mapped signal streams, to generate a different second wire-mapped signal for different second wires of the corresponding second multi-wire cables such that each second wire-mapped signal comprises a different combination of all of the corresponding input signal streams; and generating retransmission signals for the corresponding second wires of the corresponding second multi-wire cable based on the corresponding second wire-mapped signals, wherein the total number of first wires in the first multi-wire cables correspond to the number of second wires in the second multi-wire cable, wherein different reception systems connect to different first multi-wire cables, and wherein the transmission system connects to the second multi-wire cable.

* * * * *

UNITED STATES PATENT AND TRADEMARK OFFICE
CERTIFICATE OF CORRECTION

PATENT NO.       : 8,279,745 B2
APPLICATION NO.  : 12/623751
DATED            : October 2, 2012
INVENTOR(S)      : Dent It is certified that error appears in the above-identified patent and that said Letters Patent is hereby corrected as shown below:

In Column 9, Line 9, delete "$\hat{S}_{w1}, \hat{S}_{wd}, \ldots, \hat{S}_{wM}$," and insert -- $\hat{S}_{w1}, \hat{S}_{w2}, \ldots, \hat{S}_{wM}$, --, therefor.

In Column 10, Line 2, in Equation (2), delete "$S_{w2}=S_1+S_2-S_3-S_4$" and insert -- $S_{w2}=S_1-S_2+S_3-S_4$ --, therefor.

In Column 11, Lines 12-13, delete the space between "$\hat{s}_{w1} \quad (2), \ldots, \hat{s}_{w1}(N))$".

In Column 13, Line 26, delete "$_2c$" and insert -- $c_2$ --, therefor.

In Column 13, Line 46, delete "M×xM" and insert -- M×M --, therefor.

In Column 14, Line 59, delete "$L_{ij}$ or $L_{ij}$" and insert -- $L_{ii}$ or $L_{jj}$ --, therefor.

In Column 14, Line 60, delete "$L_{1j}$ and" and insert -- and $L_{ij}$ --, therefor.

In Column 15, Lines 24-25, delete "$[C]^-=[F]^-[\Lambda]_{-1}[F]$," and insert -- $[C]^{-1}=[F]^{-1}[\Lambda]^{-1}[F]$, --, therefor.

In Column 15, Line 59, delete "$\{V_1' I_1'\}$" and insert -- $\{V_I' I_I'\}$ --, therefor.

In Column 16, Line 15, delete "$\lambda_{1i}$" and insert -- $\lambda_{ii}$ --, therefor.

In Column 16, Line 37, delete "$[\Lambda_L][\Lambda_C]1/v^2[I]$," and insert -- $[\Lambda_L][\Lambda_C]=1/v^2[I]$, --, therefor.

In Column 17, Line 29, delete "100 μm" and insert -- 100 Ωm --, therefor.

In Column 17, Line 29, delete "length" and insert -- length. --, therefor.

Signed and Sealed this
Fifth Day of February, 2013

Teresa Stanek Rea
*Acting Director of the United States Patent and Trademark Office*

CERTIFICATE OF CORRECTION (continued)
U.S. Pat. No. 8,279,745 B2

In Column 17, Line 37, delete "m≈1): 63Ω" and insert -- $m \neq 1$): 63 Ω --, therefor.

In Column 22, Line 58, delete "(POTS)." and insert -- (POTs). --, therefor.